(12) United States Patent
Hildebrand et al.

(10) Patent No.: US 7,717,013 B2
(45) Date of Patent: May 18, 2010

(54) ROTATING MACHINE ACTIVE BALANCER AND METHOD OF DYNAMICALLY BALANCING A ROTATING MACHINE SHAFT WITH TORSIONAL VIBRATIONS

(75) Inventors: Stephen Hildebrand, Apex, NC (US); Lane Miller, Fuquay-Varina, NC (US)

(73) Assignee: Lord Corporation, Cary, NC (US)

( * ) Notice: Subject to any disclaimer, the term of this patent is extended or adjusted under 35 U.S.C. 154(b) by 1249 days.

(21) Appl. No.: 11/178,860

(22) Filed: Jul. 11, 2005

(65) Prior Publication Data

US 2006/0005623 A1    Jan. 12, 2006

Related U.S. Application Data

(60) Provisional application No. 60/587,242, filed on Jul. 12, 2004.

(51) Int. Cl.
*F16F 15/12* (2006.01)
(52) U.S. Cl. .................... 74/574.2; 464/180
(58) Field of Classification Search ............ 74/570.2, 74/571.1, 572.2, 574.2; 464/180; 73/468, 73/470
See application file for complete search history.

(56) References Cited

U.S. PATENT DOCUMENTS

| | | | |
|---|---|---|---|
| 3,336,818 A | | 8/1967 | Allen |
| 3,952,612 A | | 4/1976 | Kurkowski et al. |
| 4,044,628 A | * | 8/1977 | Jacks ................... 74/574.2 |
| 4,962,677 A | * | 10/1990 | Withers ................ 74/574.2 |
| 5,099,430 A | * | 3/1992 | Hirsch ................... 73/462 |
| 5,481,142 A | | 1/1996 | James et al. |
| 5,676,025 A | | 10/1997 | Lulay |
| 5,757,662 A | | 5/1998 | Dyer et al. |
| 6,308,810 B1 | * | 10/2001 | Kuwayama ............. 188/379 |
| 6,618,646 B1 | | 9/2003 | Dyer |
| 2003/0089193 A1 | | 5/2003 | Altieri et al. |

FOREIGN PATENT DOCUMENTS

| | | |
|---|---|---|
| DE | 4337001 A1 | 5/1995 |
| GB | 1194247 | 6/1970 |

(Continued)

OTHER PUBLICATIONS

Miri et al., "Reduction of Harmonic Distortions and Subsynchronous Resonances in the Pulsed Power Supply of a Nuclear Fusion Experiment," International Conference on Power Systems Transients—IPST 2003 in New Orleans, USA, pp. 1-6.

(Continued)

*Primary Examiner*—John E Chapman
(74) *Attorney, Agent, or Firm*—Edward F. Murphy, III

(57) ABSTRACT

An active balancer for dynamically balancing a rotating machine is provided. The active balancer has a balancer body which rotates with the rotating machine and at least one controllable position counter weight having a real-time adjustable position relative to the balancer body and the rotating machine inorder to produce an actively adjustable controllable counter weight balance force for dynamically balancing the rotating machine. The active balancer includes a spring with the balancer body mounted to the rotating machine through the spring wherein the balancer body mass resonates on the spring with a torsional vibration canceling frequency which cancels a torsional vibration of the rotating machine.

34 Claims, 36 Drawing Sheets

FOREIGN PATENT DOCUMENTS

WO    WO 01/08149 A1    2/2001

OTHER PUBLICATIONS

Sihler et al., "Damping of Torsional Resonances in generator Shafts Using a Feedback Controlled Buffer Storage of Magnetic Energy," International Conference on Power Systems Transients—IPST 2003 in New Orleans, USA, pp. 1-6.

F. Joswig et al., "Perceptions About New Kinds of Subsynchronous Resonances," IPST '01, International Conference on Power Systems Transients, Rio de Janeiro, 6 pages, Jun. 24-28, 2001.

Kabiri, K.; Dommel, H. W.; Henschel, S. . A simplified system for subsynchronous resonance studies. In: International Conference on Power Systems Transients, 2001, Rio de Janeiro. Proc. 4th International Conference on Power Systems Transients, 2001. p. 234-239.

Sihler et al., "Transient Performance of Vacuum-Switched Static VAR Compensators Optimised for Large Inductive Loads," 4th International Conference on Power Systems Transients, Rio de Janeiro, 2001, pp. 481-486.

Miri et al., "Modelling of Inrush Currents in Power Transformers by a Detailed Magnetic Equivalent Circuit," 4th International Conference on Power Systems Transients, Rio de Janeiro, 2001, pp. 215-220.

Lord Corporation, "Design Monograph: Understanding Torsional Vibration," DM1107c, pp. 1-8, 1978.

http://www.engr.uconn.edu/alarm/filed/DR.html, "Advanced Laboratory for Automation, Robotics and Manufacturing," Apr. 30, 2004.

* cited by examiner

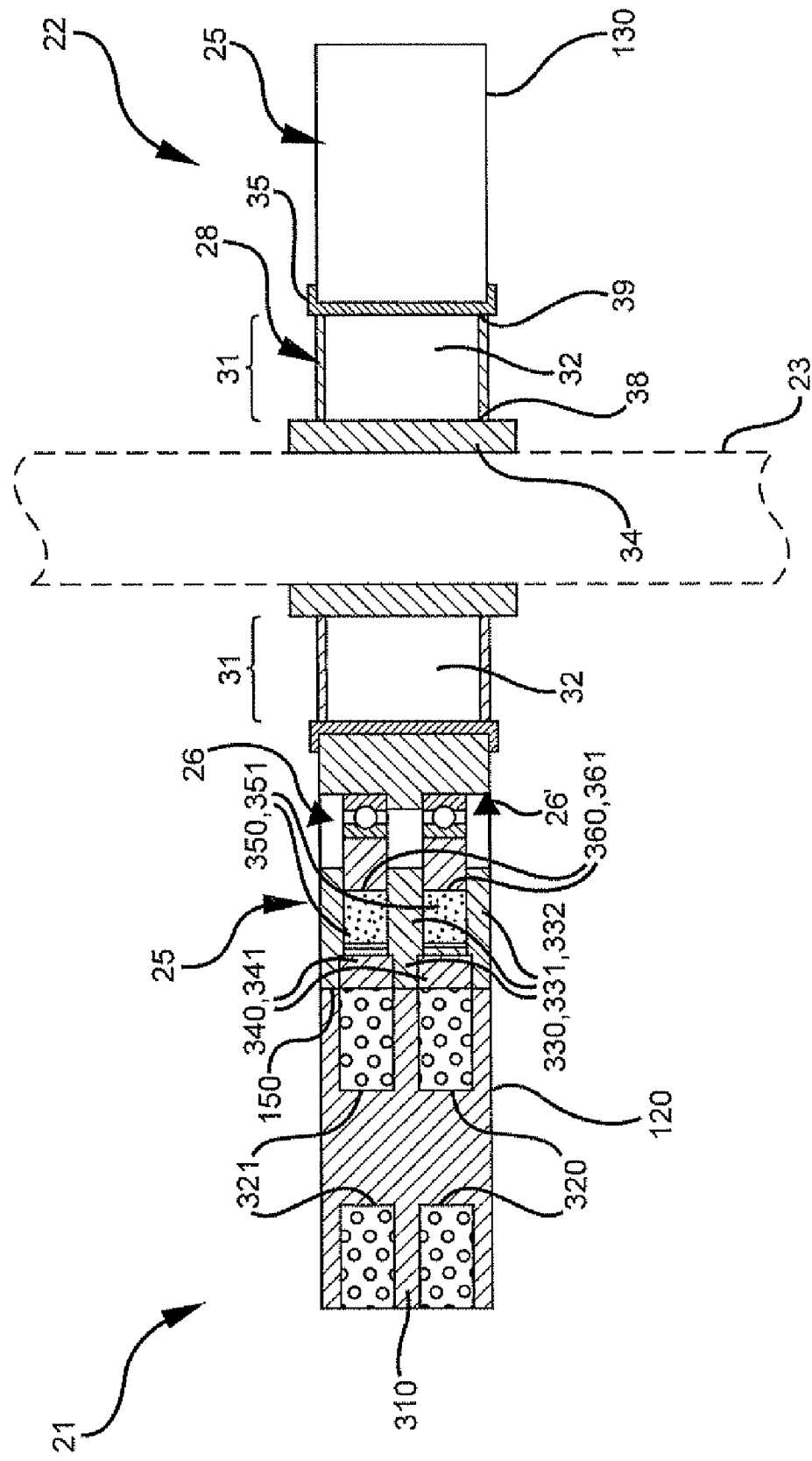

ROTATING MACHINE ACTIVE BALANCER AND METHOD OF DYNAMICALLY BALANCING A ROTATING MACHINE SHAFT WITH TORSIONAL VIBRATIONS

CROSS REFERENCE

This application claims the benefit of, and incorporates by reference, U.S. Provisional Patent Application No. 60/587,242 filed on Jul. 12, 2004.

FIELD OF THE INVENTION

The present invention relates to active balancers and active balancing of rotating machines. More particularly the invention relates to dynamically balancing rotating machines having torsional vibrations utilizing active balancers.

BACKGROUND OF THE INVENTION

Rotating machines are particularly troublesome in that the rotating machine systems are troubled by rotational imbalances and torsional vibrations that can cause fatigue and wear on the rotating machine equipment. In rotating machines including drive shafts, torsional vibrations and rotational imbalance are particularly problematic in that they can damage the actual structure and components that make up the rotating machine system in addition to hindering the operation of the rotating machine system.

There is a need for a system and method of accurately and economically balancing rotating machines. There is a need for a system and method of accurately and economically controlling torsional vibrations. There is a need for an economically feasible method of controlling torsional vibrations in a rotating shaft so that the vibrations are efficiently cancelled and minimized while rotational imbalances are dynamically balanced and minimized. There is a need for a robust system of dynamically balancing rotating machines and controlling vibrations so that the rotational problems are efficiently cancelled and minimized. There is a need for an economic method/system for controlling problematic rotational imbalances and vibrations.

SUMMARY OF THE INVENTION

The invention includes an active balancer for dynamically balancing a rotating machine having a driven shaft with a torsional vibration. The active balancer has a balancer body which rotates with the shaft, with the balancer body having a mass. The active balancer includes at least one controllable position counter weight that has an adjustable position relative to the balancer body and the shaft inorder to produce an adjustable controllable counter weight balance force for dynamically balancing the rotating machine in real time. The active balancer includes a spring, with the balancer body mounted to the shaft through the spring wherein the balancer body mass resonates on the spring with a torsional vibration canceling frequency which cancels the torsional vibration of the shaft.

The invention includes a method of actively balancing a rotating member having a torsional vibration. The method includes providing an active balancer having a balancer body which rotates with the rotating member, the balancer body having a mass. The provided active balancer includes at least one controllable position counter weight, the controllable position counter weight having an adjustable position relative to the balancer body and the rotating member inorder to produce an adjustable controllable counter weight balance force for dynamically balancing the rotating member. The method includes providing a spring and mounting the active balancer to the rotating member with the spring wherein the balancer body mass resonates on the spring with a torsional vibration canceling frequency which cancels the torsional vibration of the rotating member.

The invention includes a method of making an active balancer for dynamically balancing a rotating member having a torsional vibration, the method including providing an active balancer having a balancer body which rotates with the rotating member, the balancer body having a mass, the active balancer comprised of at least one controllable position counter weight, the controllable position counter weight having an adjustable position relative to the balancer body and the rotating member inorder to produce an adjustable controllable counter weight balance force for dynamically balancing the rotating member. The method includes providing a mounting spring having a rotating member mounting side and a balancer body attachment side, and attaching the mounting spring balancer body attachment side to the active balancer wherein the balancer body mass resonates on the spring with a torsional vibration canceling frequency which cancels the torsional vibration of the rotating member when the mounting spring rotating member mounting side is mounted on the rotating member.

The invention includes an active balancer for dynamically balancing a rotating machine having a shaft torsional vibration resonance modal mass. The active balancer has a balancer body which rotates with the rotating machine, the balancer body having a mass. The balancer body mass is less than fifteen percent of the rotating machine torsional vibration resonance modal mass. The active balancer includes at least one controllable position counter weight having an adjustable position relative to the balancer body and the rotating machine inorder to produce an adjustable controllable counter weight balance force for dynamically balancing the rotating machine. The balancer includes a spring with the balancer body mounted to the rotating machine shaft through the spring wherein the balancer body mass resonates on the spring with a torsional vibration canceling frequency.

The invention includes an active balancing system for dynamically balancing a rotating machine shaft having at least one torsional vibration. The active balancing system is comprised of a first active balancer with a first active balancer body which rotates with the shaft, the first active balancer body having a first active balancer body mass. The first active balancer is comprised of at least one first active balancer body controllable position counter weight, the first active balancer body controllable position counter weight having an adjustable position relative to the first active balancer body and the shaft inorder to produce a first active balancer adjustable controllable counter weight balance force for dynamically balancing the rotating machine. The first active balancer includes a first active balancer spring, the first active balancer body mounted to the shaft through the first active balancer spring at a first shaft position. The active balancing system includes a second active balancer, the second active balancer positioned on the shaft at a second position distal from the first active balancer, the second active balancer having a second balancer body mass and a second balancer spring, the second active balancer mounted to the shaft through the second balancer spring at the second position.

The invention includes a balancer for balancing a rotating shaft with a torsional vibration, the balancer having a balancer body which rotates with the shaft, the balancer body having a mass, the balancer comprised of at least one controllable position counter weight, the controllable position counter weight having an adjustable position relative to the balancer body and the shaft inorder to produce an adjustable controllable counter weight balance force for balancing the rotating shaft, with the balancer including a spring, the balancer body mounted to the shaft through the spring wherein the balancer body mass resonates on the spring with a torsional vibration canceling frequency which cancels the torsional vibration of the shaft.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

Various advantages of the present invention will become apparent to those skilled in the art by reading the following specification and by reference to the following drawings in which:

FIG. 3B is a side and partial cut-away view of the balancer shown in FIG. 3A;

DETAILED DESCRIPTION OF THE PREFERRED EMBODIMENTS

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

The invention includes an active balancer and method for real time dynamic balancing of a rotating machine drive shaft that has a torsional vibration disturbance. The active balancer includes a balancer body with a mass that rotates with the shaft. The active balancer includes at least one controllable position counter weight rotor, preferably two controllable position counter weight rotors, that have real time controlled adjustable angular positions relative to the balancer body and the shaft inorder to produce an adjustable controllable counter weight balance force vector for dynamically balancing the rotating machine in real time. The active balancer includes a spring, with the balancer body mounted to the shaft through the spring wherein the balancer body mass is utilized as a tuned vibration absorber and resonates on the spring with a torsional vibration canceling frequency which dampens and cancels the torsional vibration of the shaft. The active balancer of the invention includes a spring mounting to the rotating shaft so the sprung mass of the active balancer is utilized as a tuned vibration damper to absorb the torsional vibrations in addition to generating the adjustable controllable counter weight balance force vector for dynamically compensating for a machine unbalance. The spring mounted active balancer provides a means for absorbing torsional vibrations of the rotating machine along with a means for actively generating an adjustable counter weight balance force vector for dynamically compensating an unbalance of the rotating machine.

Figure 1A:
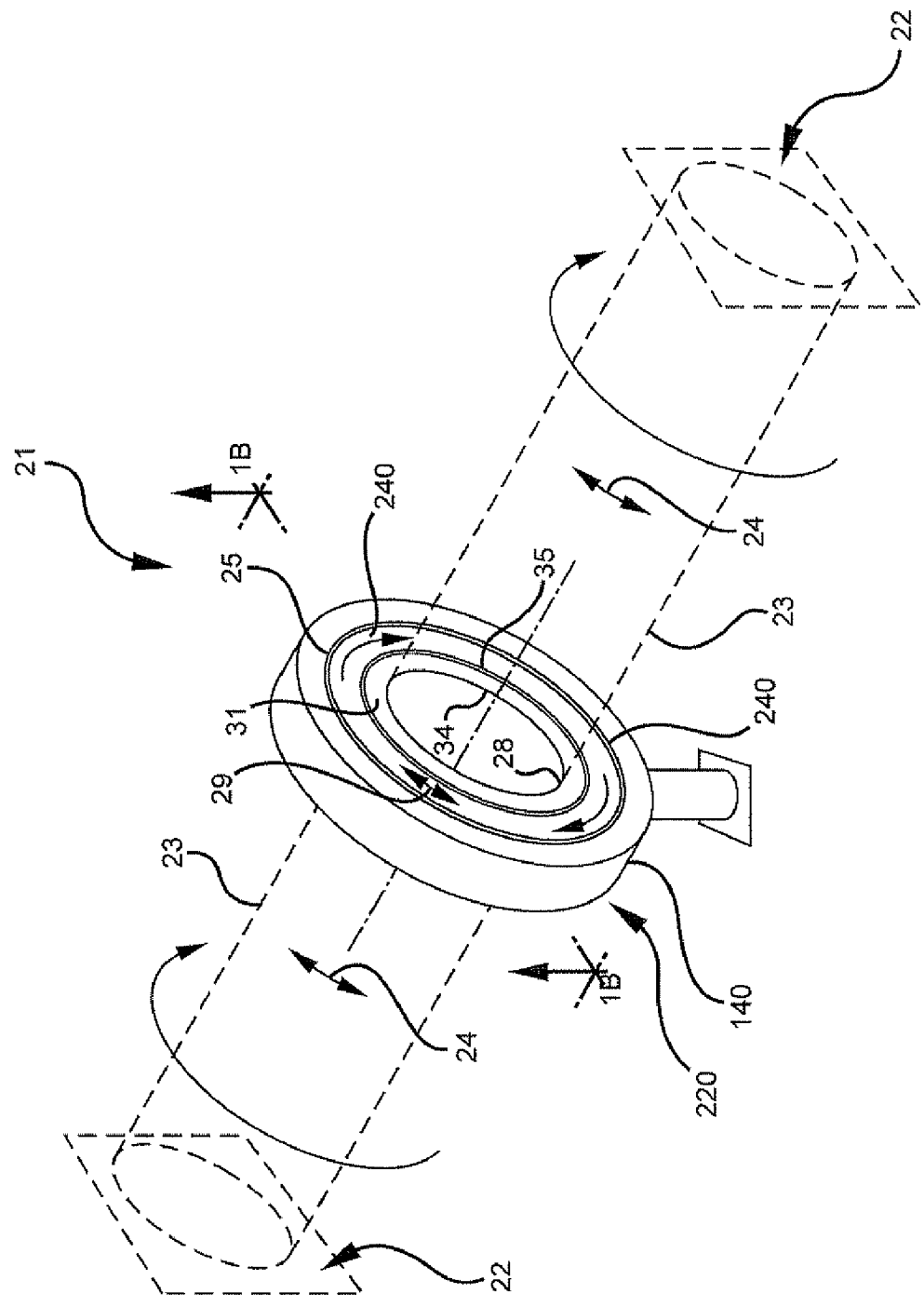
FIG. 1A is an isometric view of an active balancer on a rotating machine.
Figure 1B:
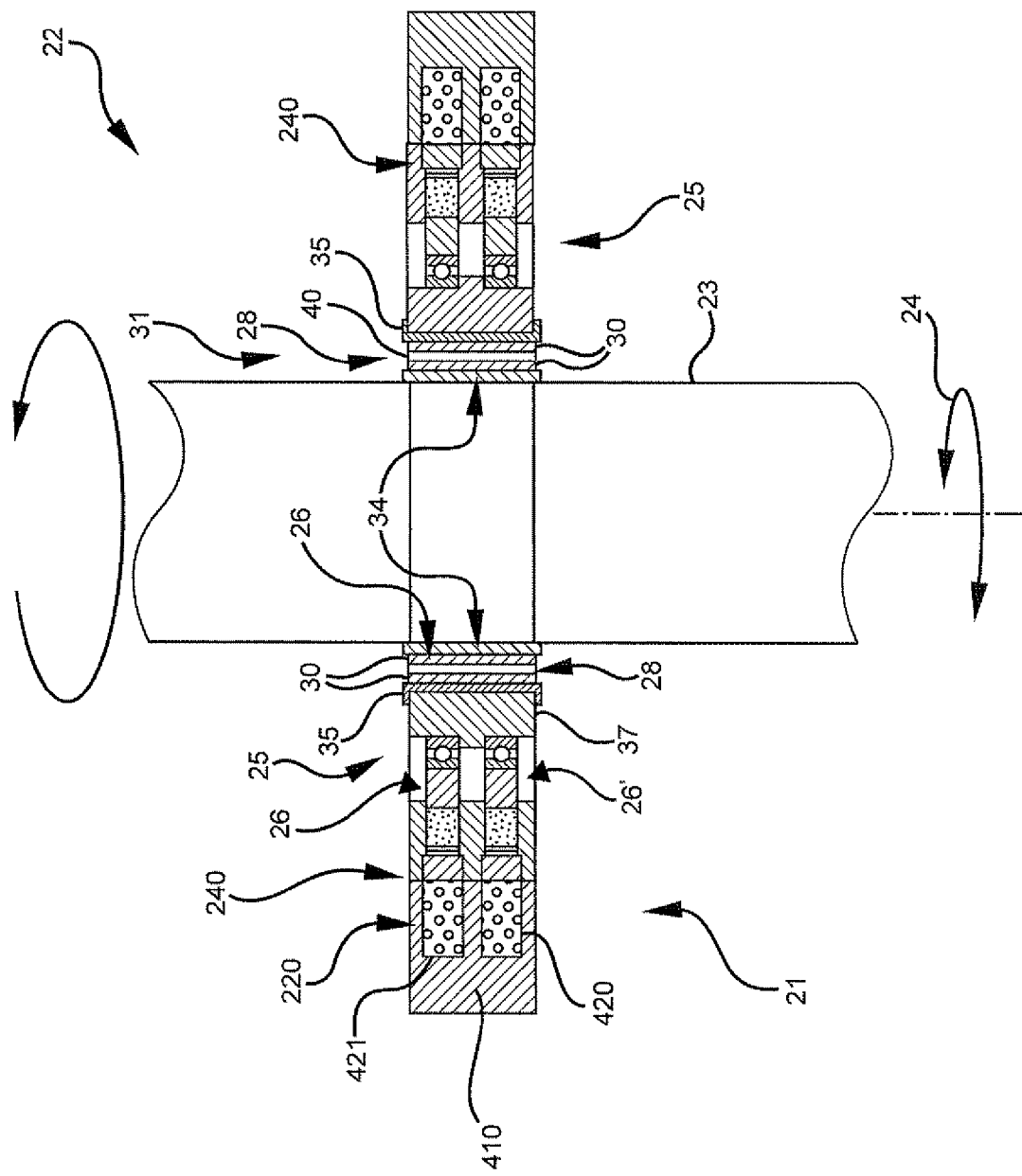
FIG. 1B is a side and partial cut-away view of the balancer shown in FIG. 1A.
Figure 2A:
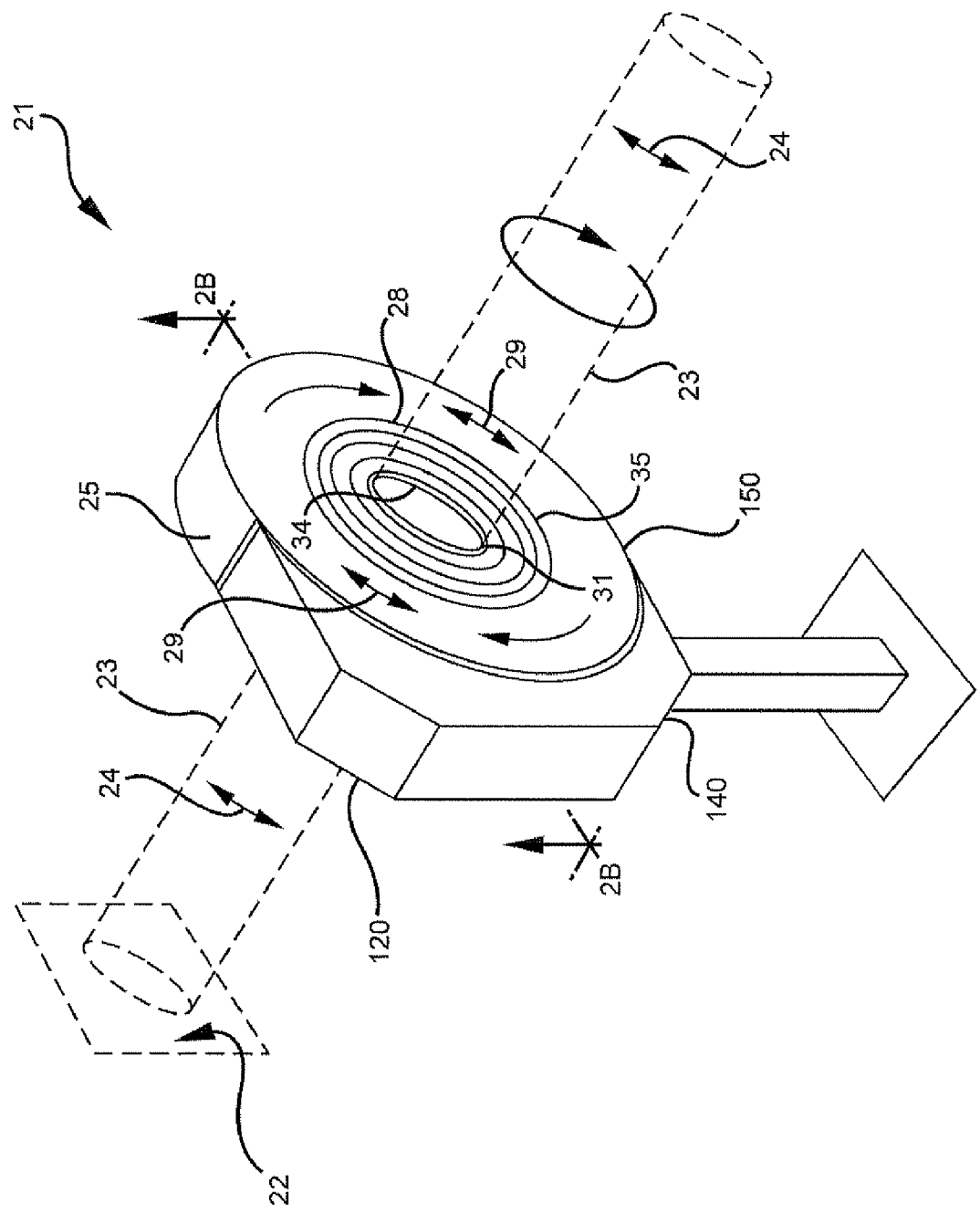
FIG. 2A is an isometric view of an active balancer on a rotating machine.
Figure 2B:
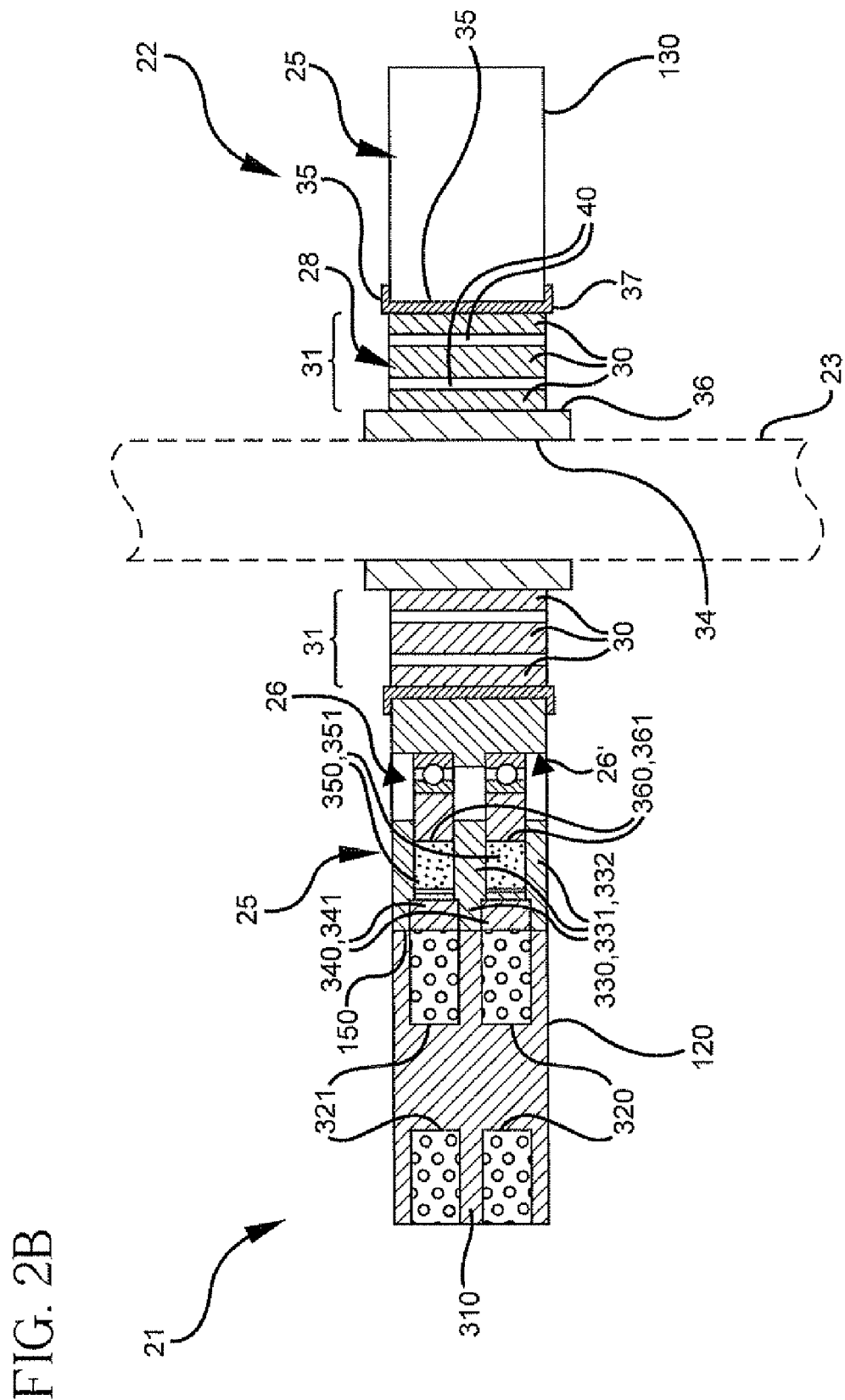
FIG. 2B is a side and partial cut-away view of the balancer shown in FIG. 2A.
Figure 3A:
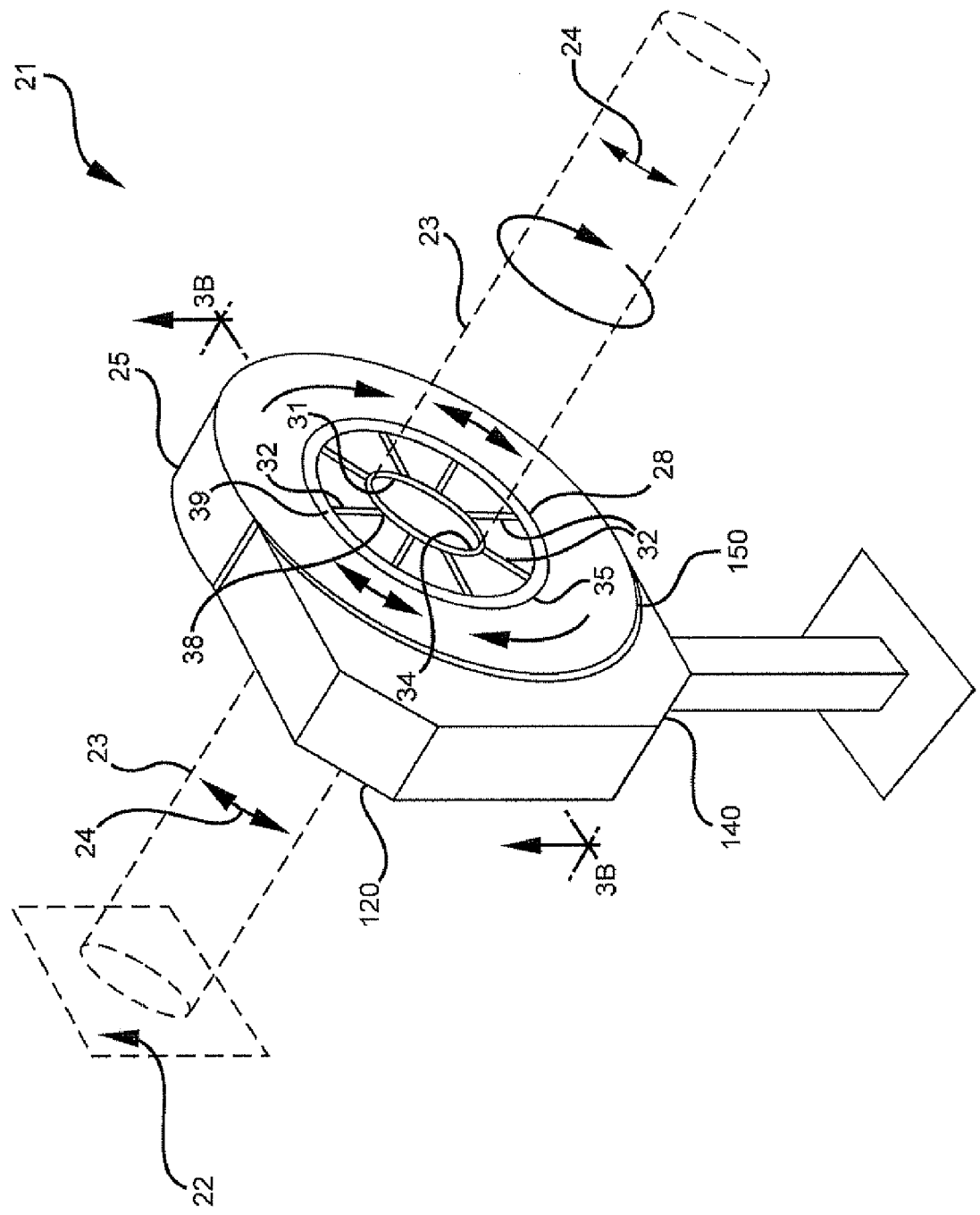
FIG. 3A is an isometric view of an active balancer on a rotating machine.
Figure 4:
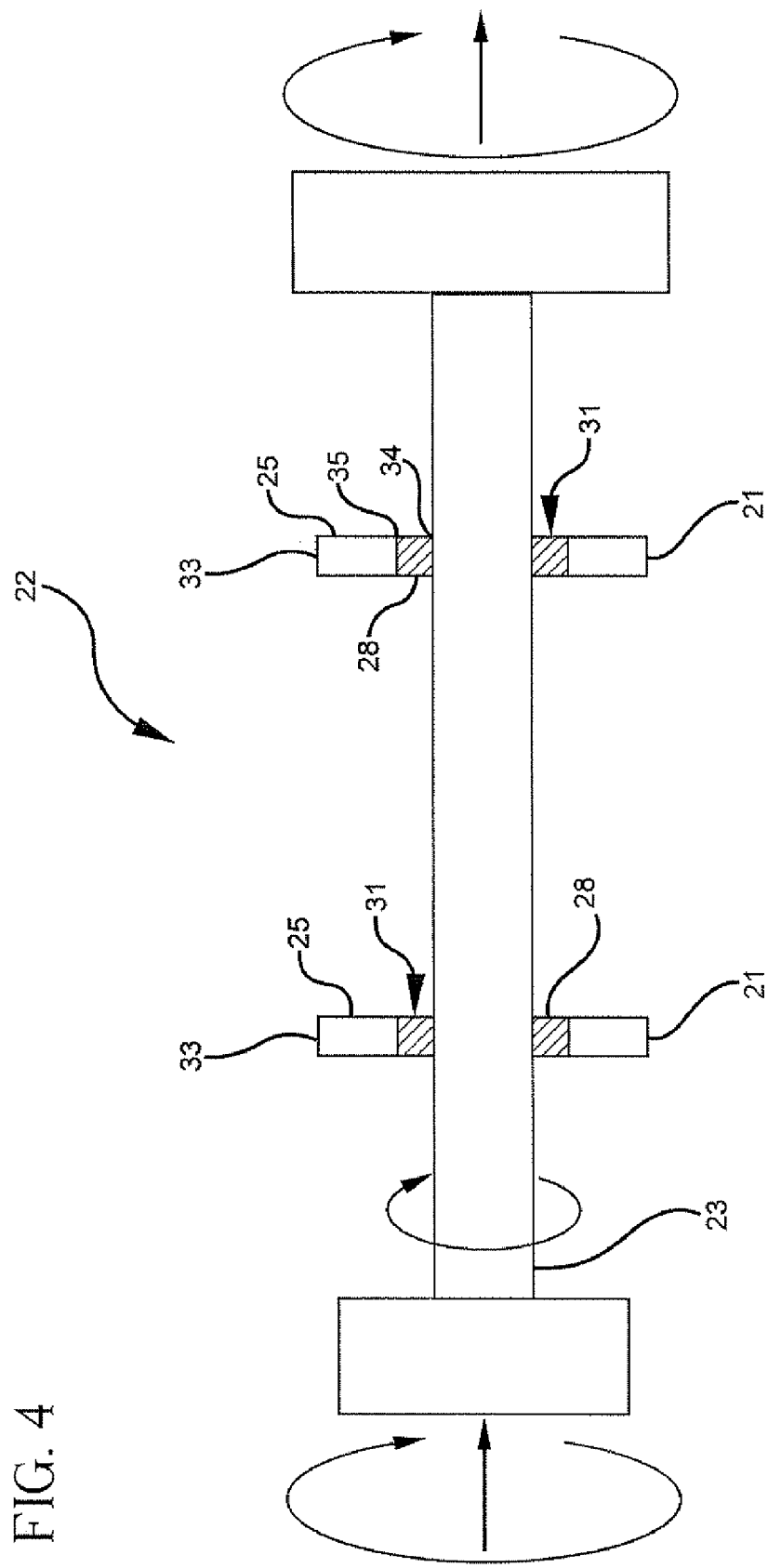
FIG. 4 shows a rotating machine with two active balancers.

As shown in the FIG. 1-3, the active balancer 21 dynamically balances a rotating machine 22 having a driven shaft 23 with a torsional vibration 24. The active balancer 21 has a balancer body 25 which rotates with the shaft 23, with the balancer body 25 having a mass. The active balancer preferably includes at least one controllable position counter weight 26,26' that has an adjustable position 27 relative to the balancer body 25 and the shaft 23 inorder to produce an adjustable controllable counter weight balance force for dynamically balancing the rotating machine in real time. The active balancer 21 includes a spring 28, with the balancer body 25 mounted to the shaft 23 through the spring 28 wherein the balancer body mass resonates on the spring 28 with a torsional vibration canceling frequency 29 which cancels the torsional vibration 24 of the shaft 23. Preferably the active balancer controllable position counter weight 26,26' is electromagnetically actuated and moved around the shaft 23, most preferably with balance ring rotors 350, 351, moved relative to shaft 23 and body 25 with a controllable electromagnetic field, such as with driver magnetic flux lines 1510 and permanent magnets 360,361. Preferably the active balancer 21 is comprised of a first controllable position counter weight 26 and a second controllable position counter weight 26', which are positioned and clocked around the shaft 23 to produce a net balance correction force vector 530 that dynamically balances out the unbalance of the rotating machine 22, most preferably with first and second balancing ring rotors 350, 351 utilized as the controllable position counter weights 26,26' with their position around the shaft 23 actively controlled to produce the proper magnitude and position of net balance correction force vector 530. Preferably the first controllable position counter weight 26 and the second controllable position counter weight 26' produce a net balance correction vector 530 with a magnitude and angular position that counter acts the imbalance of the rotating shaft 23 while the oscillations 29 of the balancer body 25 on the spring 28 cancel the torsional vibrations 24 of the shaft 23. Preferably the active balancer 21 includes a controller 140 which controls and actuates the position of the first controllable position counter weight 26 and the position of the second controllable position counter weight 26'. Preferably the active balancer controller 140 utilizes sensor inputs to real time dynamically balance the rotating machine 22, and electromagnetically adjusts the positions of the balancing ring rotors 350, 351 with an electromagnetic driver assembly 120, 220 to produce a minimum sensed unbalance of the rotating machine. The spring 28 provides for a resilient flexure interface 31 between the balancer body mass 25 and the shaft 23 with the balancer body mass having a delayed oscillation 29 which destructively interferes with the shaft torsional vibration 24. In a preferred embodiment the spring 28 is comprised of an elastomer 30. In an alternative embodiment the spring 28 is comprised of a plurality of radiating spokes 32. In an embodiment the invention includes an active balancer system with the first active balancer 21 and a second active balancer 21 on the shaft 23 of rotating machine 22. The second active balancer 21 is positioned on the driven shaft 23 at a second position distal from the first active balancer 21, with the second active balancer having a second balancer body 25 with a mass and a second balancer spring 28. The second active balancer 21 is mounted to the shaft 23 through the second balancer spring 28 at the second position wherein the second balancer body mass resonates on the second balancer spring with a second balancer torsional vibration canceling frequency which cancels a torsional vibration 24 in the shaft 23. Preferably the plurality of active balancers 21 are located at anti-nodes 33 of one or more torsional shaft resonances 24 of shaft 23. In an embodiment both active balancers 21 have their torsional resonance frequency 29 tuned to cancel the same torsional shaft resonances 24. In an embodiment each active balancers 21 has its torsional resonance frequency 29 tuned to cancel a different torsional shaft resonance of the shaft 23. Preferably the controllable position counter weight 26 is detuned to not resonate at the torsional vibration 24, such that the counter weight's own resonance relative to the balancer body 25 is not excited by the torsional vibration 24. Preferably controllable position counter weight balancing ring rotors 350, 351 are tuned so that they do not go into resonance relative to the balancer body 25, such that at the canceling frequency 29 the first controllable position counter weight 26 and the second controllable position counter weight 26' are detuned to not resonate at the torsional vibration, with the counter weights 26,26' stationary relative to the balancer body 25 unless controlled to move by the controller 140. Preferably the inertia vibration forces generated by the oscillation of balancer body 25 on the spring 28 do not overcome the magnet holding force of the rotors 350, 351, so that the counter weights 26,26' do not change their detent position.

The invention includes a method of actively balancing a rotating machine shaft member 23 having a torsional vibration 24. The method includes providing an active balancer 21 having a balancer body 25 which rotates with the rotating member 23. The balancer body 25 has a mass, and includes at least one controllable position counter weight 26,26', with the controllable position counter weight 26,26' having an adjustable position 27 relative to the balancer body 25 and the rotating member 23 inorder to produce an adjustable controllable counter weight balance force 530 for dynamically balancing the rotating member. The method includes providing a spring 28, and mounting the active balancer to the rotating member 23 with the spring 28 wherein the balancer body mass resonates on the spring 28 with a torsional vibration canceling frequency 29 which cancels the torsional vibration 24 of the rotating member 22. Preferably providing an active balancer 21 with at least one controllable position counter weight 26,26' includes providing an active balancer with an electromagnetically actuated counter weight 26,26' which is electromagnetically moved around the rotating shaft member 23. Preferably the electromagnetically actuated counter weight 26,26' is a balance ring rotor 350, 351, with the balance ring rotor moved relative to the rotating machine shaft member 23 with a controllable electromagnetic field. Preferably providing an active balancer 21 includes providing an active balancer with a first controllable position counter weight 26 and a second controllable position counter weight 26', with the positions of the counter weights clocked around the rotating member 23 wherein the first controllable position counter weight and the second controllable position counter weight produce a net balance correction vector 530 with a magnitude and angular position that counter acts the imbalance of the rotating member. Preferably the method includes providing a controller 140 which controls and actuates the position of the controllable position counter weight 26,26', preferably utilizing sensor inputs with the positions adjusted to produce minimum sensed unbalance. Providing a spring 28 includes providing a resilient flexure interface 31 between the balancer body 25 and the rotating member 23 with the balancer body mass having a delayed oscillation 29 which destructively interferes with the rotating member torsional vibration 24. Providing a spring 28 preferably includes providing a spring comprised of an elastomer 30. In an embodiment, providing a spring 28 includes providing a spring comprised of a plurality of radiating spokes 32. Preferably the rotating member torsional vibration has a shaft torsional resonance modal rotational inertia mass with the balancer body rotational inertia mass less than fifteen percent of the shaft torsional resonance modal mass, preferably the balancer body rotational inertia mass is about 8-12% of the shaft torsional resonance modal rotational inertia mass, and most preferably the balancer body mass is about 10% (10±1%). Preferably the method includes providing a second active balancer 21. The second active balancer 21 having a second balancer body 25 mass and a second balancer spring 28, mounting the second active balancer 21 through the second balancer spring 28 at a second position on the rotating member 23 wherein the second balancer body mass resonates on the second balancer spring 28 with a second balancer torsional vibration canceling frequency 29 which cancels a torsional vibration 24. Preferably the plurality of active balancers 21 are located at distal positioned anti-nodes 33 of one or more torsional shaft resonances of the rotating member 23. In an embodiment the first and second active balancers 21 have their torsional resonance frequency tuned to cancel the same torsional shaft vibration resonance 24. In an embodiment the first and second active balancers 21 have their torsional resonance frequency tuned to cancel different torsional shaft resonances 24. Preferably the method includes detuning the controllable position counter weight 26,26' to not resonate at the torsional vibration 24, preferably the orthogonal stiffnesses are selected so that it does not go into resonance with the torsional vibration so that the counter weight rotor does not separately resonate at the vibration which is to be cancelled.

The invention includes a method of making an active balancer 21 for dynamically balancing a rotating member 23 having a torsional vibration 24. The method includes providing an active balancer 21 having a balancer body 25 which rotates with the rotating member 23. The provided balancer body 25 has a mass, with the active balancer comprised of at least one controllable position counter weight 26,26'. The controllable position counter weight 26,26' has an adjustable position 27 relative to the balancer body 25 and the rotating member 23 inorder to produce an adjustable controllable counter weight balance force 530 for dynamically balancing the rotating member. The method includes providing a mounting spring 28 having a rotating member mounting side 34 and a balancer body attachment side 35, and attaching the mounting spring balancer body attachment side 35 to the active balancer 21 wherein the balancer body mass resonates on the spring 28 with a torsional vibration canceling frequency 29 which cancels the torsional vibration 24 of the rotating member 23 when the mounting spring rotating member mounting side 34 is mounted on the rotating member 23. Preferably providing an active balancer 21 with at least one controllable position counter weight 26,26' includes providing an active balancer 21 with an electromagnetically actuated counter weight 26,26' which is electromagnetically moved around the rotating member 23, preferably with the counter weight 26,26' moved relative to the rotating member 23 and the body 25 with a controllable electromagnetic field. Preferably providing an active balancer 21 with at least one controllable position counter weight 26,26' includes providing an active balancer 21 with a first controllable position counter weight 26 and a second controllable position counter weight 26' which are positioned and clocked around the rotating member 23 to produce a net balance correction vector 530 with a magnitude and angular position that counter acts the unbalance of the rotating member 23. Preferably the method includes providing a controller 140 which controls and actuates the position of the first controllable position counter weight 26 and the position of the second controllable position counter weight 26', preferably utilizing sensor inputs with the positions adjusted to produce minimum sensed unbalance. Preferably providing a mounting spring 28 includes providing a resilient flexure interface 31 between the balancer body 25 and the rotating member 23 with the balancer body mass having a delayed oscillation 29 which destructively interferes with the rotating member torsional vibration 24. Preferably providing a mounting spring 28 includes providing a mounting spring 28 comprised of an elastomeric spring 30 having a rotating member mounting inner side 36 and a balancer body outer side 37. In an embodiment providing a mounting spring 28 includes providing a mounting spring comprised of a plurality of radiating spokes 32 having rotating member mounting inner ends 38 and distal balancer body outer ends 39.

The invention includes an active balancer 21 for dynamically balancing a rotating machine 22 having a shaft torsional vibration resonance modal rotational inertia mass. The active balancer 21 has a balancer body 25 which rotates with the rotating machine 22. The balancer body 25 has a mass with the balancer body mass less than fifteen percent of the rotating machine torsional vibration resonance modal mass rotational inertia. The active balancer 21 is preferably comprised of at least one controllable position counter weight 26,26' that has an adjustable position relative to the balancer body 25 and the rotating machine 22 inorder to produce an adjustable controllable counter weight balance force for dynamically balancing the rotating machine. The balancer 21 includes a spring 28 with the balancer body 25 mounted to the shaft 23 through the spring 28 wherein the balancer body mass resonates on the spring 28 with a torsional vibration canceling frequency 29. Preferably the balancer body mass is about 8-12% of the rotating machine torsional vibration resonance modal mass rotational inertia. Preferably the balancer body mass is less than about eleven percent of the rotating machine torsional vibration resonance modal mass rotational inertia, preferably about 10% (10±1%) of the rotating machine torsional vibration resonance modal mass rotational inertia.

The invention includes an active balancing system for dynamically balancing a rotating machine longitudinal shaft 23 having at least one torsional vibration 24. The active balancing system includes a first active balancer 21 with a first active balancer body 25 which rotates with the shaft, the first active balancer body having a first active balancer body mass. The first active balancer 21 includes at least one first active balancer body controllable position counter weight 26,26' having an adjustable position 27 relative to the first active balancer body 25 and the shaft 23 inorder to produce a first active balancer adjustable controllable counter weight balance force 520 for dynamically balancing the rotating machine. The first active balancer 21 includes a first active balancer spring 28 with the first active balancer body 25 mounted to the shaft 23 through the first active balancer spring 28 at a first shaft position. The active balancing system includes a second active balancer 21, the second active balancer 21 positioned on the shaft 23 at a second position distal from the first active balancer. The second active balancer 21 having a second balancer body mass and a second balancer spring 28 with the second active balancer 21 mounted to the shaft 23 through the second balancer spring 28 at the second position. Preferably the plurality of balancers 21 are located at anti-resonances 33 of one or more torsional shaft resonances of shaft 23. In an embodiment each balancer 21 has its torsional resonance frequency 29 tuned to cancel the same torsional shaft resonances 24 of the shaft. In an embodiment each balancer 21 has its torsional resonance frequency 29 tuned to cancel different torsional shaft resonances of the shaft.

Figure 28A:
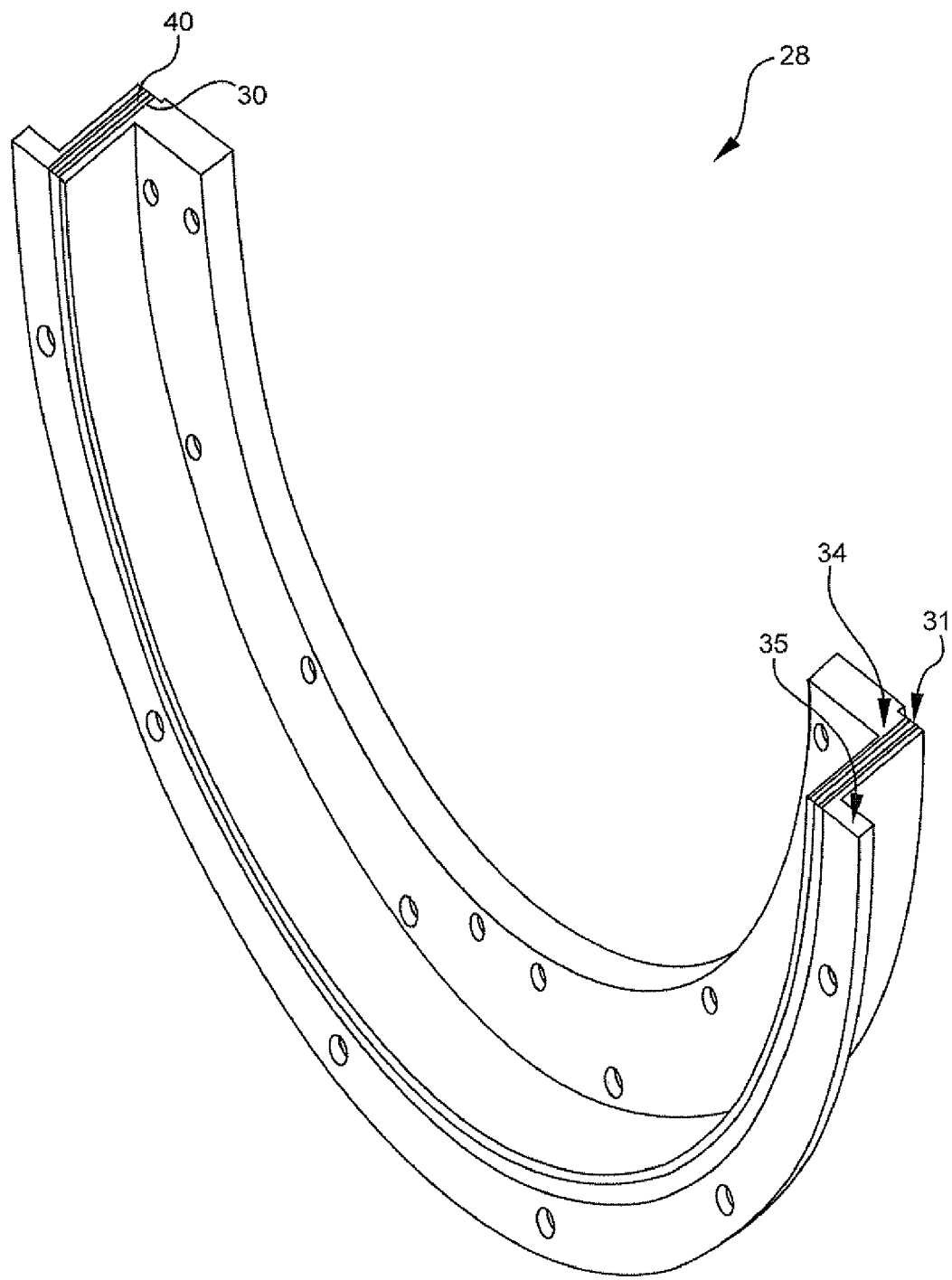
FIG. 28A-D are isometric views of active balancer sprung mounts.
Figure 28B:
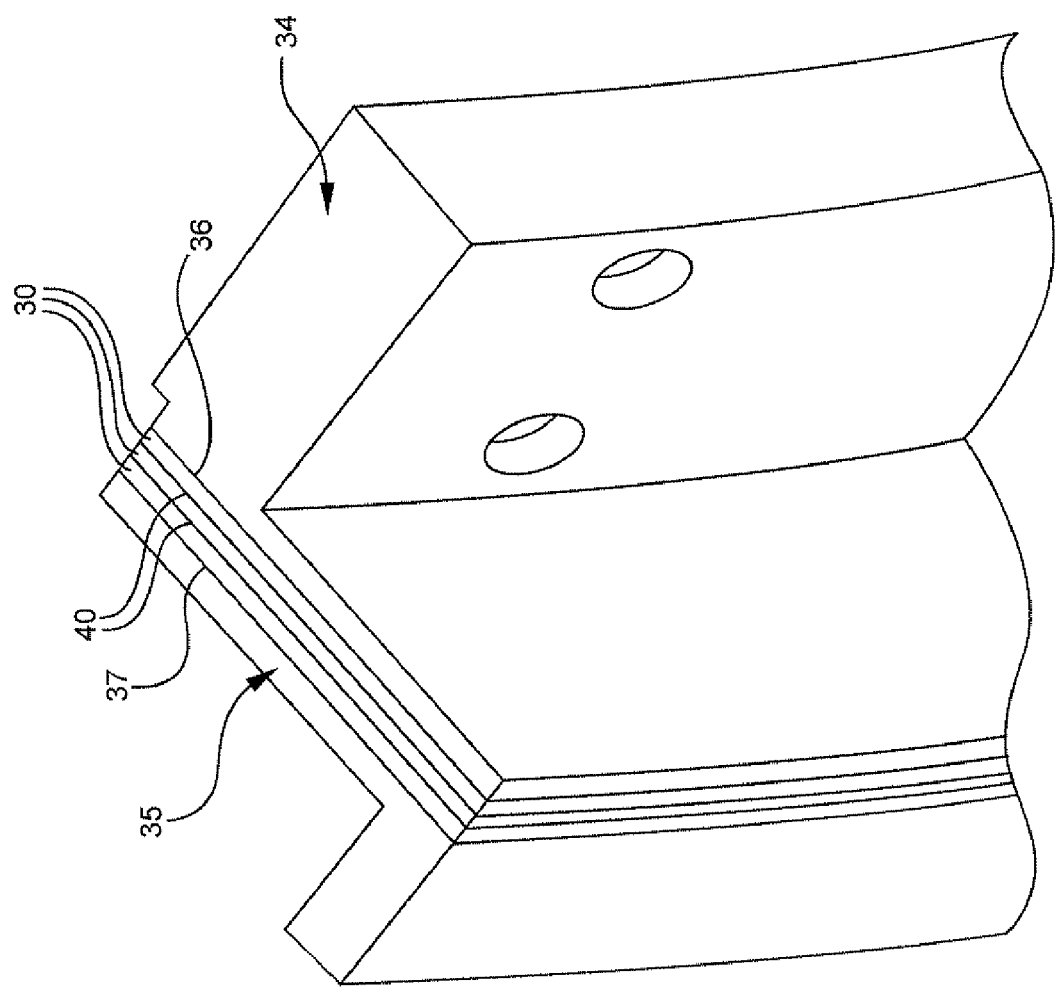
Figure 28C:
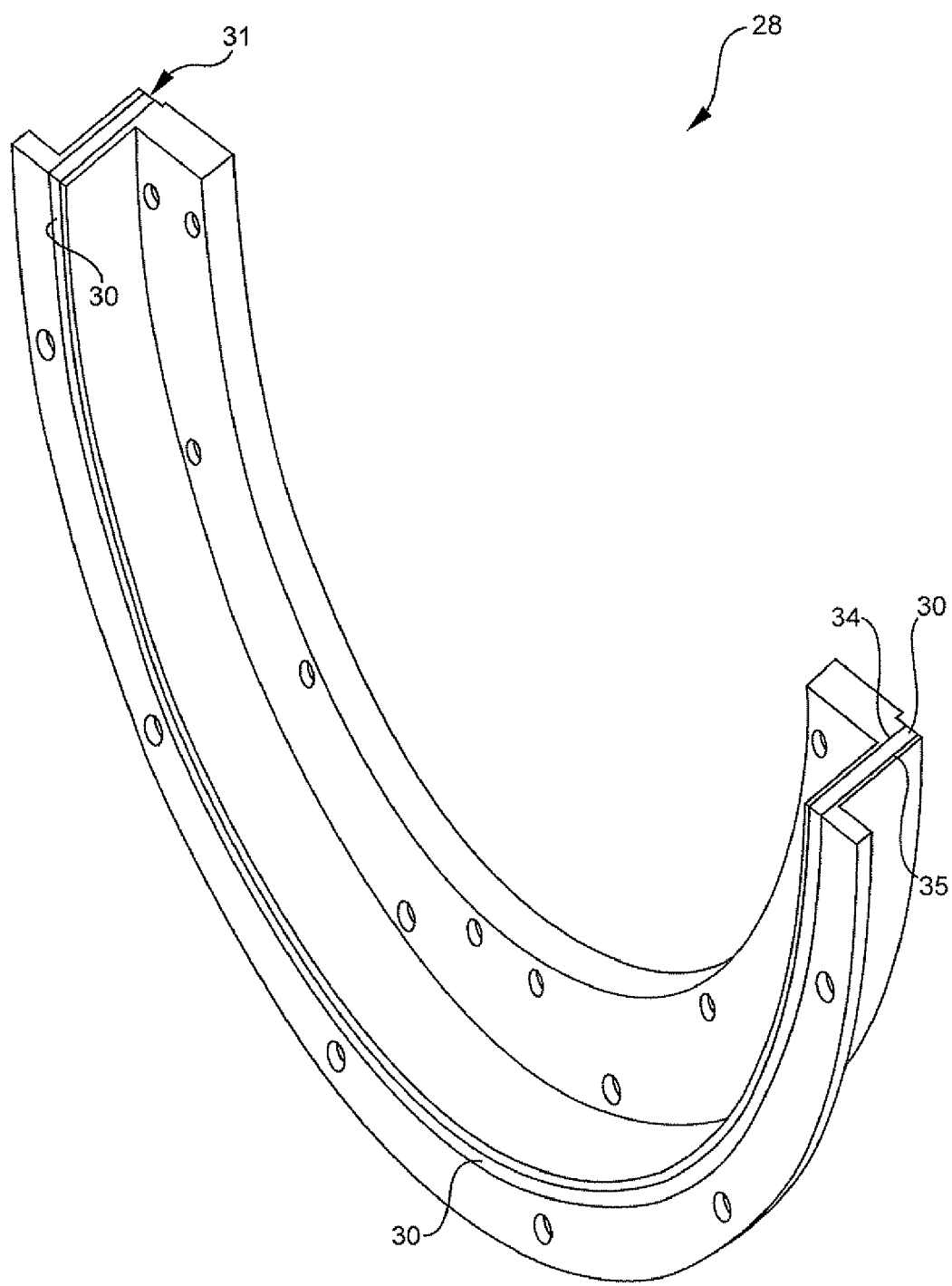
Figure 28D:
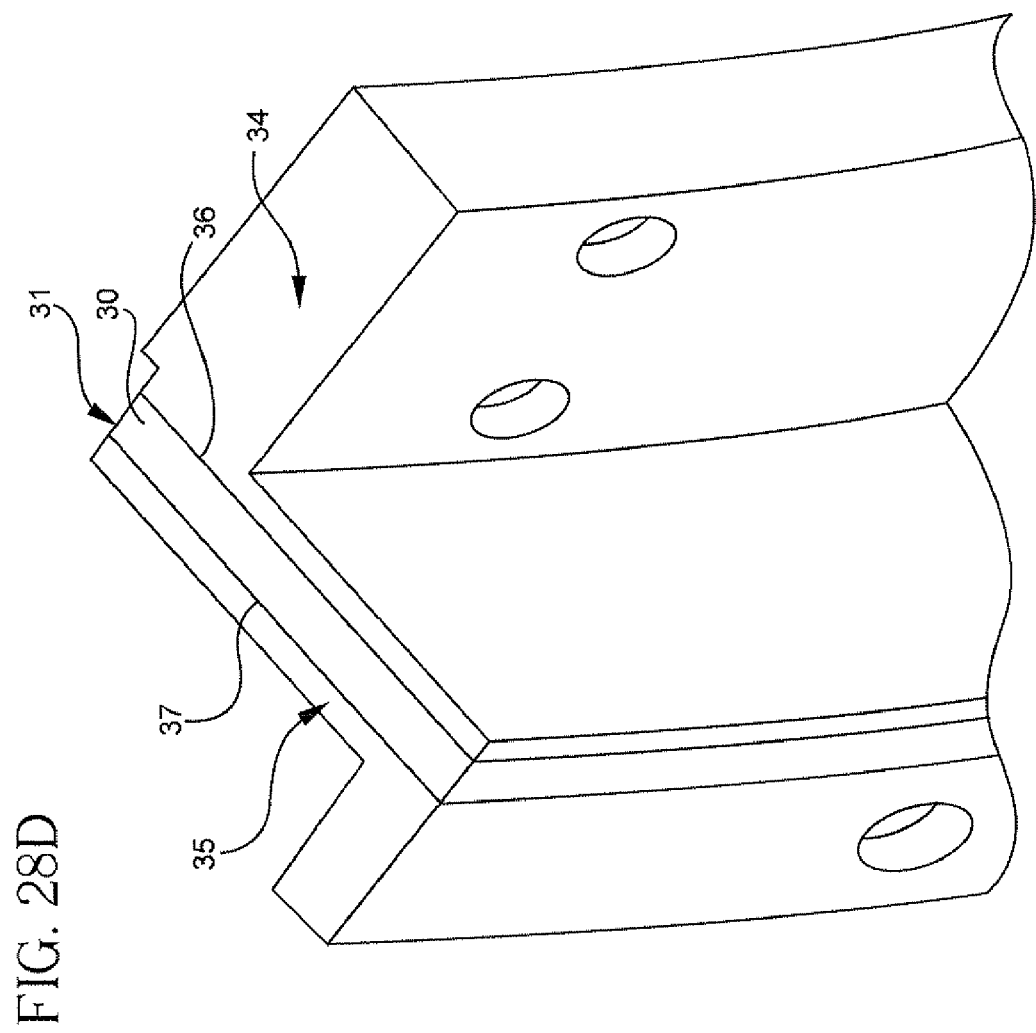
Figure 29A:
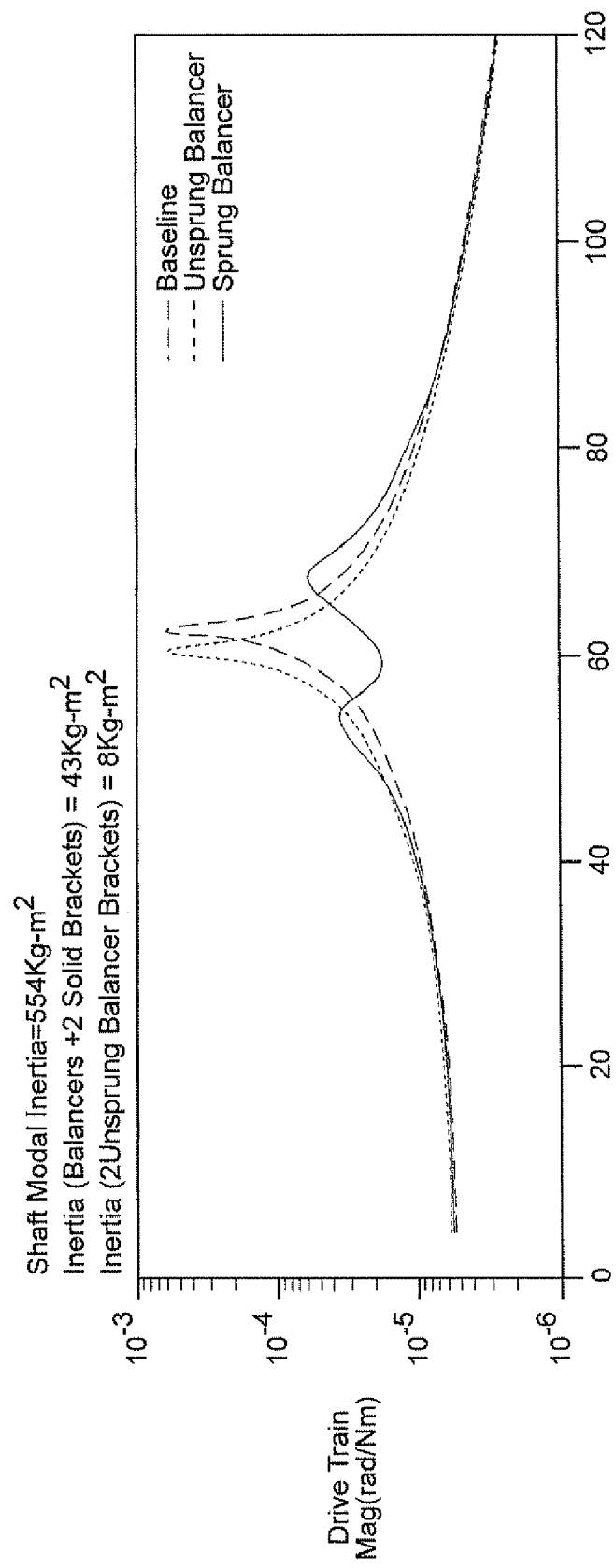
FIG. 29A-B are graphs showing torsional vibration damping with active balancers.
Figure 29B:
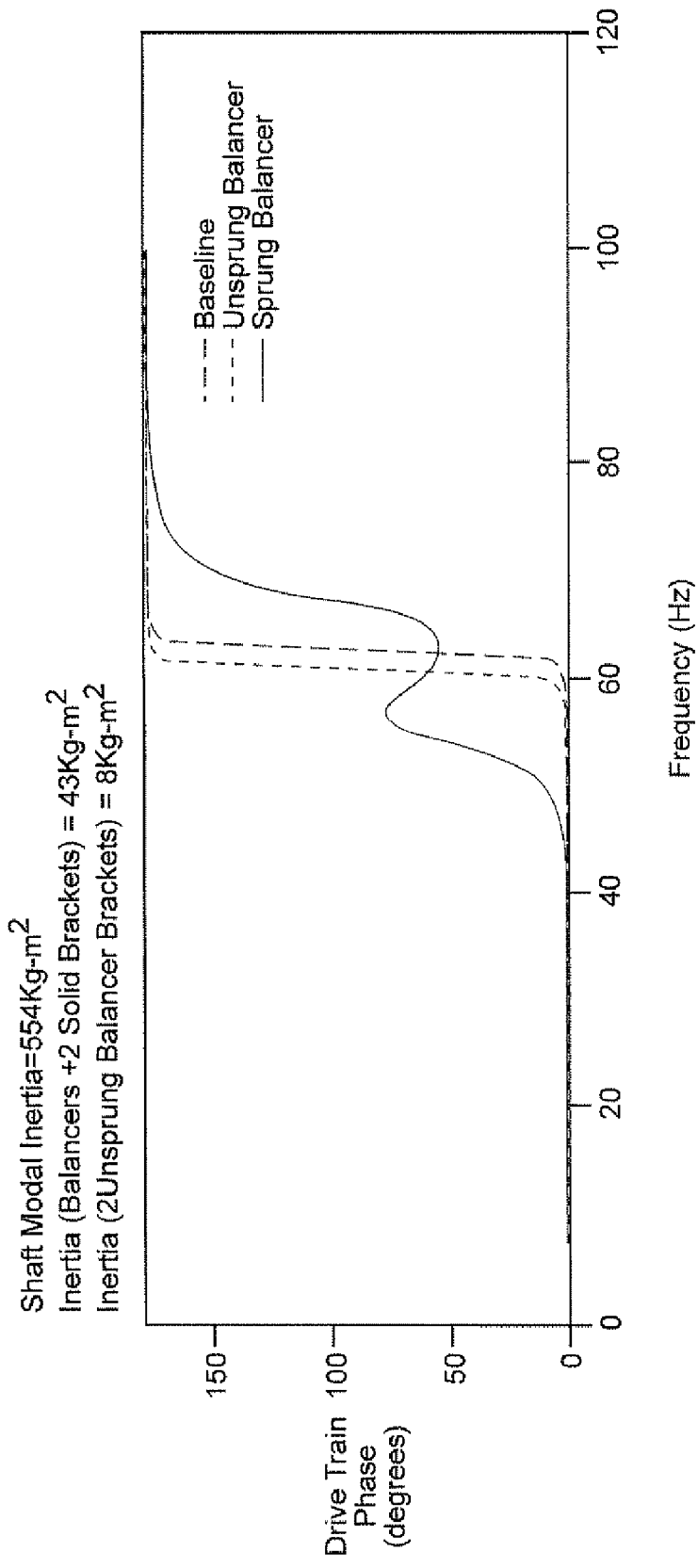

The inertia of the balancer body 25 is used as the inertia for the integral tuned vibration damper active balancer 21, to provide an active balancing system to control lateral unbalance vibration in critical areas of the rotating machine 22 shaft line while controlling torsional vibration resonance responses of the shaft 23. In a preferred embodiment the spring 28 is comprised of an elastomer 30 incorporated into the bracket used for attaching the balancer body 25 to the shaft 23. In an embodiment the elastomer spring bracket includes a plurality of elastomer laminated layers bonded to non-elastomeric members. Alternating layers of elastomer 30 and thin tubular non-elastomeric nonextensible metal shim members 40 are bonded together to provide high radial stiffness while allowing the spring structure to be compliant in the tangential direction. The tangential compliance and damping are utilized to tune the spring structure to the desired frequency for canceling the torsional vibration of the shaft. FIG. 28 shows elastomer springs 28 tuned to 63 hz. Half of an elastomer spring member 28, in the fowl of a semi-circle is shown in FIGS. 28A and 28C. FIG. 28A-B show an embodiment with elastomer laminated layers and non-elastomeric nonextensible shims. FIG. 28C-D show an embodiment with elastomer 30 bonded between rotating member mounting side mounting bracket member 34 and spring balancer body attachment mounting side bracket member 35. Preferably the non-elastomeric nonextensible shims 40 are metal. Preferably the non-elastomeric nonextensible spring rotating member mounting side 34 is comprised of a metal mounting bracket. Preferably the non-elastomeric nonextensible spring balancer body attachment side 35 is comprised of a metal mounting bracket. Preferably the elastomer 30 is bonded to the non-elastomeric metal members, preferably by bonding the elastomer to the nonelastomer metal members with a chemical bonding adhesive, preferably along with vulcanization curing in a pressurized rubber mold. Preferably the elastomer layers 30 are laminated between the non-elastomeric nonextensible spring rotating member mounting side metal mounting bracket 34, the non-elastomeric nonextensible metal shims 40, and the non-elastomeric nonextensible spring balancer body attachment side metal mounting bracket 35, preferably by bonding the elastomer to the nonelastomer metal members with a chemical bonding adhesive, preferably along with vulcanization curing in a pressurized rubber mold. Attachment of the balancer body 25 through the spring 28 to the shaft 23 by this means significantly alters the inertial contribution of the active balancer to the torsional response of the rotating machine shaft. The graphs in FIG. 29 shows a predicted response of our invention modeled to the $3^{rd}$ torsional critical of a rotating machine power plant turbine line shaft based on three sets of assumptions: (1.) The Baseline condition, (blue), is for the rotating machine turbine line shaft without the addition of any balancers. The total modal inertia of the modeled shaft was taken as a modal inertia of 554 kg-m$^2$ (response at the $3^{rd}$ critical) ($3^{rd}$ torsional critical shaft total modal mass rotational inertia of 554 kg-m$^2$); (2.) The addition of two Un-sprung Balancers, (red) with a combined inertia of 43 kg-m$^2$ in the area of rotating machine turbine line shaft clutch reduces the resonant frequency of our model to 60.5 hz as shown. At an operating speed of 60 hz, it can be readily seen that forced response of the system with a 60.5 hz resonance will likely be a whole number multiple of the response with a 62.8 hz resonance; (3.) The response with two sprung active balancers 21, (green), is achieved with brackets such as shown in FIG. 28C so that roughly 50% of the bracket mass (spring mount balancer body attachment bracket member 35), and 100% of the balancer body 25 mass is sprung and tuned to a resonant frequency of 63 hz. This results in a slightly lower shaft $3^{rd}$ torsional critical frequency because of the un-sprung bracket mass. However, the resonant peaks are split and reduced by about 30% from the baseline condition. This can be expected to result in improved torsional response of the shaft to transients. This is very important if the shaft is more likely to be damaged by response to transients than to forced vibration at 60 hz. The change in forced response at the 60 hz operating speed is a whole number multiple lower than the baseline system.

FIG. 2-3 show active balancers 21 with stationary and generally "C", or angle shaped driver or electromagnetic field generators 120 which are in electromagnetic communication with generally circular rotating balancer bodies 25. The active balancer assembly system preferably includes a remote stationary microprocessor based controller 140, operating under stored computer program control and adapted to control the active balancer in a manner which is specified by the stored program and certain environmental and measured parameters. The control of active balancer 21 is achieved by selectively activating driver 120. As shown, driver 120 is adapted to be positioned in a relatively close but non-contacting position to balancer body 25, separated by an air gap 150. Such an air gap, in the preferred embodiment of the invention, should be as small as possible without allowing frictional contact between the rotating balancer body 25 and the stationary driver 120 during machine operation. The electromagnetic field signal emanates from driver 120 and is received by balancer body 25. Since the power loss incurred by the electromagnetic signal is directly proportional to the algebraic square of the length of the air gap, the smaller the air gap, the more efficient the active balancer 21 will be.

FIG. 1 shows an embodiment of the invention. In this embodiment, the driver, or electromagnetic field generator, 220 comprises a generally circular shaped assembly, concentrically positioned in relation to the balancer body 25. Furthermore, as in FIG. 2-3, there exists a gap 240 between the concentric driver 220 and the rotating balancer body 25.

Referring now to FIGS. 2B and 3B, there are shown partial cross-section views of the active balancer. A section view of the side-mounted driver 120 shows a driver coil core 310 and two independent electrical coil windings 320 and 321. The driver core 310 comprises magnetic material and acts to concentrate and enhance electromagnetic field magnetic flux generated when electric current passes through the coil windings 320 and 321. The driver core 310 could be made from a single piece of magnetic material or consist of an assembly of components. Coil windings 320 and 321, in a preferred embodiment, comprise mutually insulated electrical wire wound in a manner so as to form two substantially independent coils. The direction of current flow is orthogonal to the plane of the paper. When current is passed selectively through these windings, an electromagnetic field is generated which moves rotor assemblies 350 and 351 of the controllable position counter weights 26,26' to accomplish balance compensation.

As is further shown in FIGS. 2B and 3B, rotating balancer body 25 includes the assembled combination of generally circular and substantially similarly shaped pole plates 330, 331, and 332 which are separated by generally circular and mutually similarly shaped non-magnetic and preferably non-electrically conductive spacers 340 and 341. Spacers 340 and 341, in embodiments of the invention, would comprise axially symmetric annular aluminum or stainless steel rings of rectangular cross-section. The rectangular cross-section of the spacers should have sides about ¼ inch long. The outer radius of the spacers should be substantially similar to the outer radius of the pole plates 330-332. Situated between, and in non-contacting proximity to the pole plates 330-332, are the controllable position counter weight rotors 350 and 351. The plates 330-332, spacers 340-341, and controllable position counter weight rotors 350-351 may also have different geometric shapes from those shown and described. However, in one embodiment of the invention, plates 330-332 should all be approximately the same size and shape. Spacers 340-341 should also have mutually similar geometry, as should controllable position counter weight rotors 350-351. The controllable position counter weight rotor geometry, however, is modified so that each rotor is unbalanced about it's own centerline. As will be discussed, driver 120 electromagnetically causes the controllable position counter weight rotors 350-351, and their accompanying "heavy spots", to rotate with respect to the balancer body 25 and the shaft 23 in accordance with stored control software and in accordance with certain measured quantities.

An embodiment of the invention is shown in FIG. 1A. A cross-section view shows the concentric driver 220 previously described and shown in FIG. 1B. The driver core 410 enhances the magnetic field generated when current is passed through either driver coil winding 420 or 421. The components shown in FIG. 1B are similar to those described with reference to FIGS. 2B and 3B.

In a preferred embodiment of the invention, controllable position counter weight rotor 350 is substantially similar in structure and operation to controllable position counter weight rotor 351 and that pole plate 330 is also substantially similar in structure and operation to pole plates 331 and 332. For this reason, the following discussion will center around the combination of controllable position counter weight rotor 350 and pole plates 330 and 331. However, it should be realized that the following discussion is equally applicable to controllable position counter weight rotor 351 and pole plates 331 and 332.

Controllable position counter weight rotor 350, in a preferred embodiment, has a substantially circular shape and is made or formed from stainless steel, aluminum, or some other desired and conventional non-magnetic material. Controllable position counter weight rotor 350 may have a diameter and width of desired and selected dimensions, in an embodiment, the diameter and width are respectively about six inches and about 0.25 inches. Furthermore, electromagnetically controllable position counter weight rotor 350 possesses a plurality of permanent magnets 360 and 361 which are equally spaced and peripherally mounted in the rotor, remote from shaft 23. The permanent magnets 360-361 are mounted such that their magnetic polarity is oriented parallel to the rotating shaft machine axis of rotation and adjacent magnets have reverse polarity. As further shown, electromagnetically controllable position counter weight rotor 350 is suspended between pole plates 330 and 331 by a ball bearing assembly 370 which is effective to allow rotor 350 to move rotationally in relation to plates 330 and 331 and balancer body 25 in response to an applied electromagnetic field. In a preferred embodiment of approximately forty-five substantially similar balls 380 are used in each ball bearing assembly 370 and 371, though different numbers of balls are acceptable. In the preferred embodiments of the invention, the movement of electromagnetically controllable position counter weight rotors 350 and 351 in a selective manner will correct for machine rotating imbalance and hence reduce or eliminate unbalance vibration at the machine rotating frequency. Such electromagnetically controllable position counter weight rotor movement, as discussed, is accomplished preferably by means of controller 140 in cooperation with the drivers (120, 220), ball bearing assembly 370, pole plates 330-331 and permanent magnets 360-361.

Figure 5:
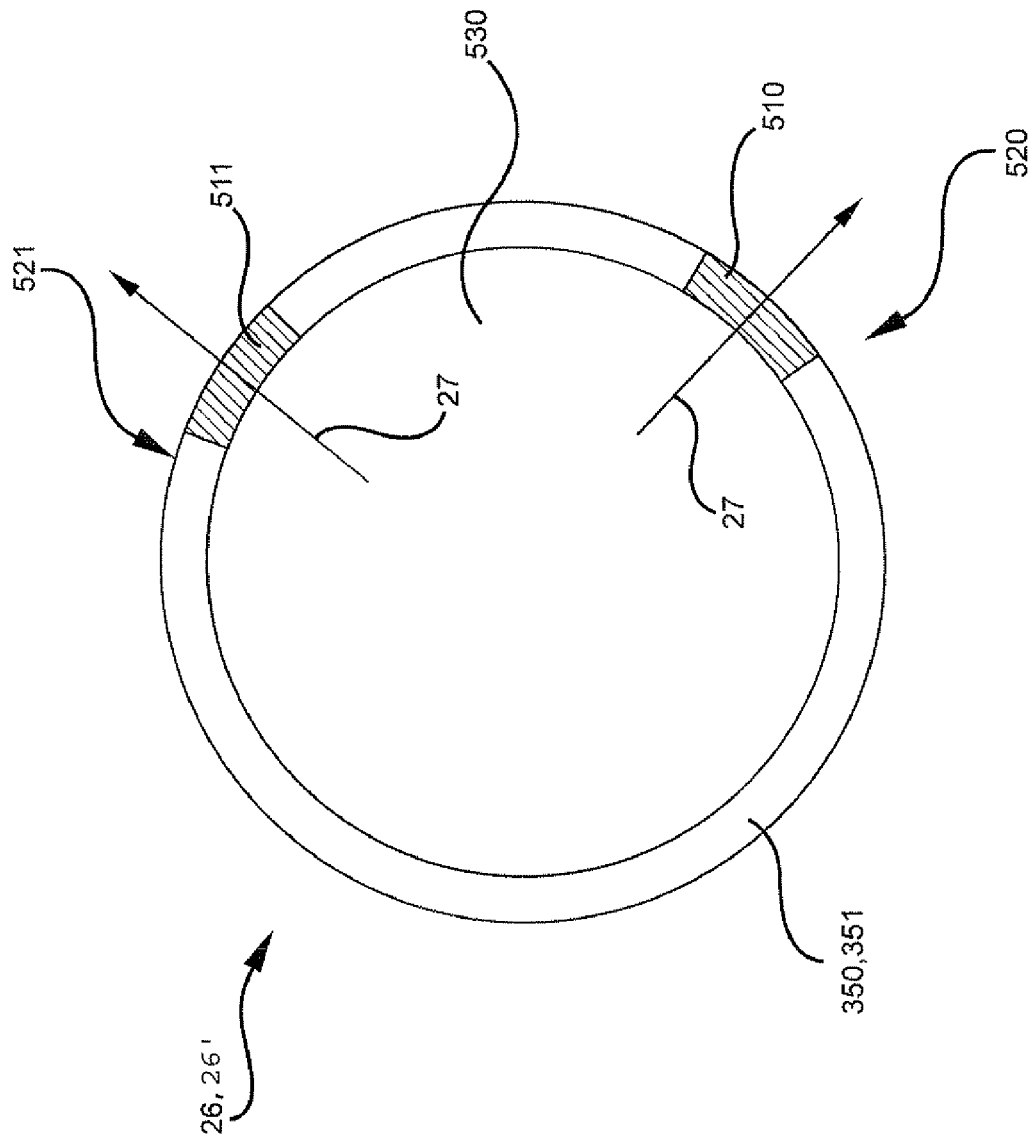
FIG. 5 is a diagrammatic view of balancer rotors.
Figure 6:
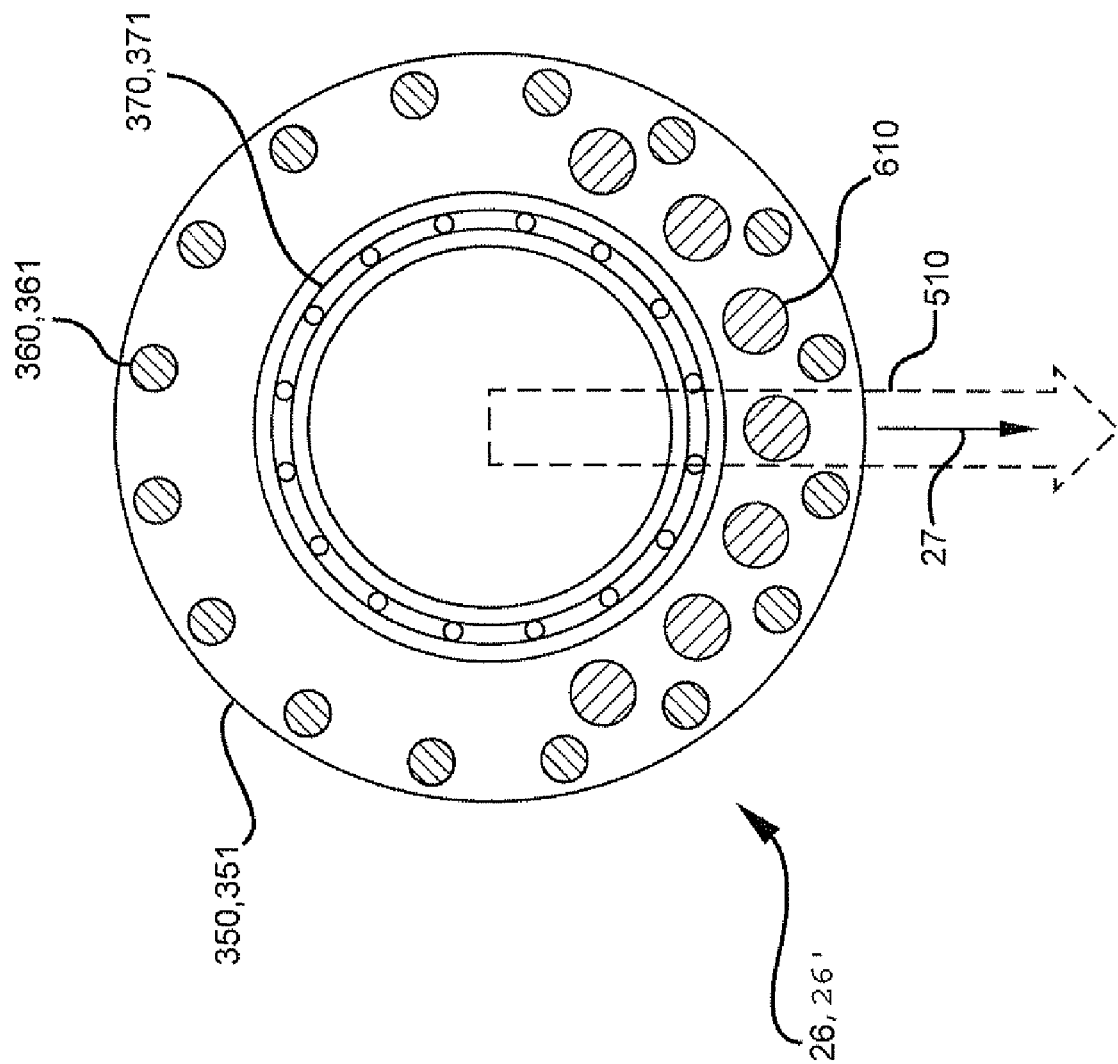
FIG. 6 is a front view of a rotor showing a configuration of weighted inserts which provide unbalance to the rotor.
Figure 7:
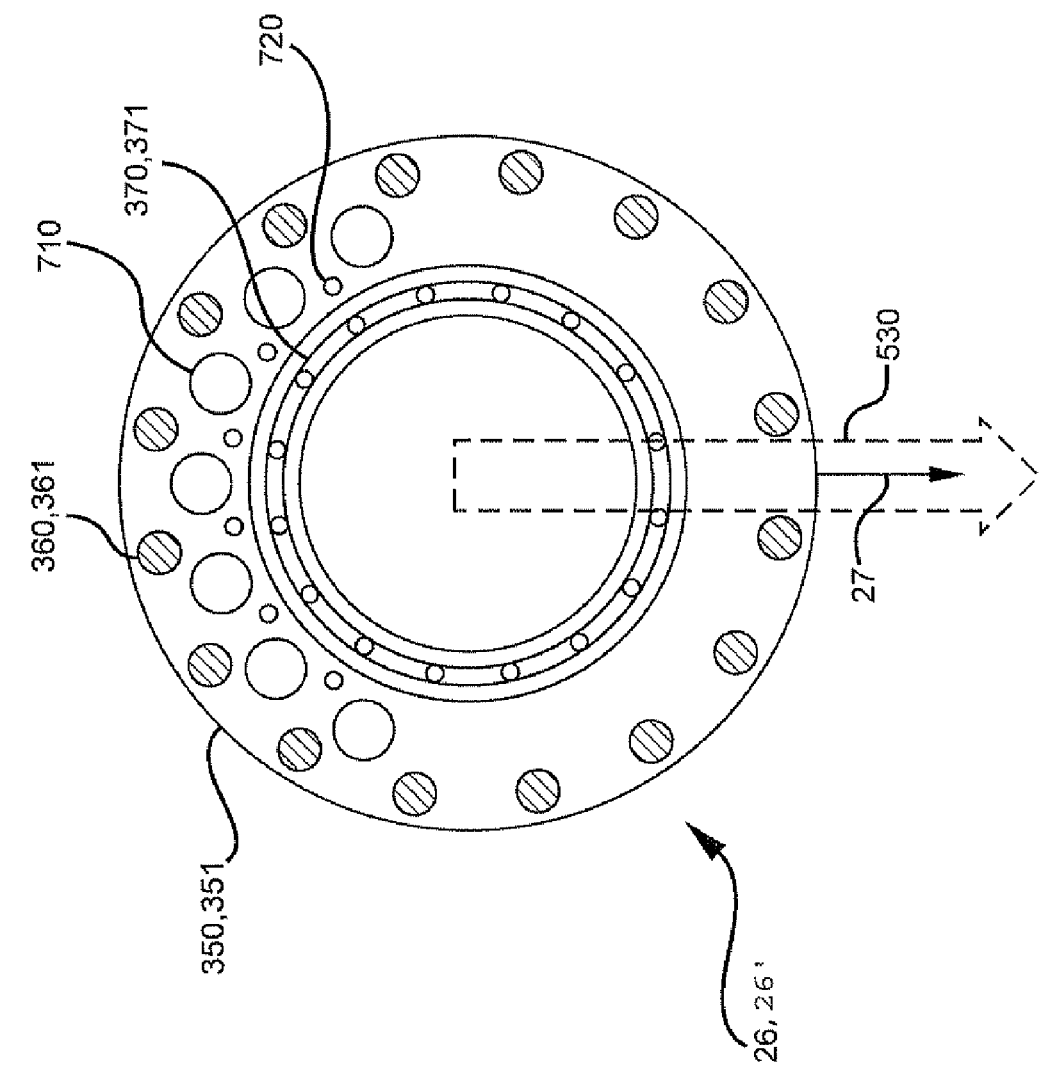
FIG. 7 is a front view of a rotor showing a configuration of machined holes which provide unbalance to the rotor.
Figure 8:
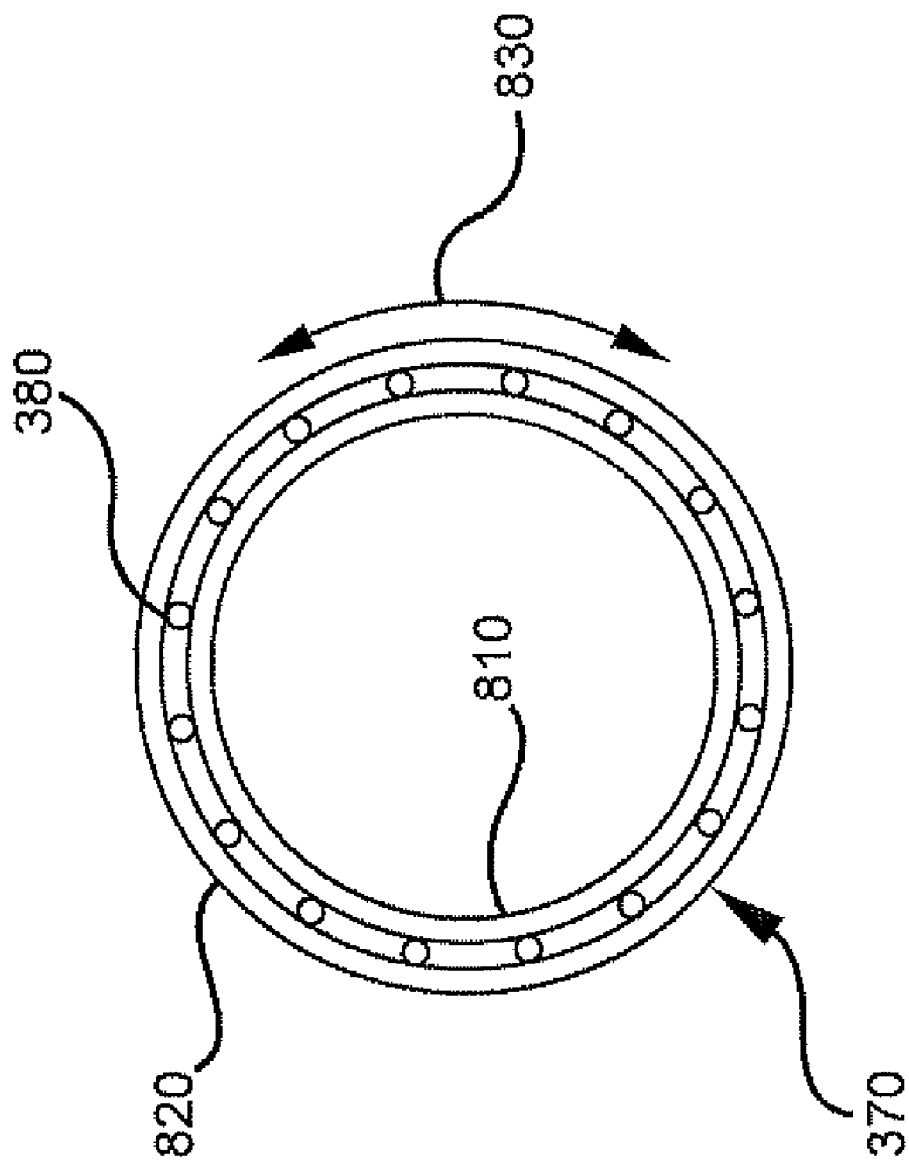
FIG. 8 is a front view of a ball bearing assembly mounted on the balancer rotating assembly and used to support the moveable rotors.

To understand such controllable position counter weight rotor movement imbalance correction, reference is now made to FIG. 5 which shows diagrammatic representations of controllable position counter weights 26,26' and the adjustable position 27 of the respective rotor heavy or unbalance correction "spots". As shown, each of the controllable position counter weight rotors 350 and 351 include heavier portions 510 and 511 which produce unbalance vectors 520 and 521. These unbalance vectors 520 and 521 mathematically combine to form the net imbalance correction vector 530. The net correction vector 530 may be calculated using trigonometry knowing the magnitudes and angular position of each rotor effective weight, or each rotor's individual "unbalance" vector. These weighted portions may be distributed along controllable position counter weight rotors 350 and 351 in any desired pattern. As FIG. 6 shows, the weighted portion for each controllable position counter weight rotor may, in one embodiment, consist of lead or other relatively dense material inserts 610 which are fastened within the individual rotors 350-351. Each insert 610 provides a vector having both a direction and an amplitude which is related to the position of rotor 350, 351 and the weight of the spot. The various vectors result in a rotor "heavy" spot 510. As shown in FIG. 7, the weighted portion may, in another embodiment, be introduced by machining holes 710 or otherwise removing material from portions of the rotors such that these portions are lighter than other rotor portions. The pattern of machined holes could, in one embodiment of the invention, include smaller diameter holes 720 which would allow increased mass to be removed from the rotor while maintaining structural integrity. Note that the controllable position counter weight rotors 350-351, in one embodiment of the invention, are mounted to the balancer body 25 using ball bearing assemblies 370-371. FIG. 8 shows ball bearing assembly 370, which is substantially similar to 371. The inner bearing race 810 is mounted to the balancer body 25 around the shaft 23. The outer bearing race 820 supports the controllable position counter weight rotor 350 or 351 allowing it to rotate as shown by reference 830 with respect to the balancer body 25 and shaft 23 with very little friction. The need to minimize dry friction is discussed later in this document. Bearing assembly 370, in one embodiment of the invention, is a commercially available ball bearing assembly substantially similar to a model KAO35CP0 bearing assembly manufactured by the Kaydon Corporation of Muskegon, Mich.

Figure 9:
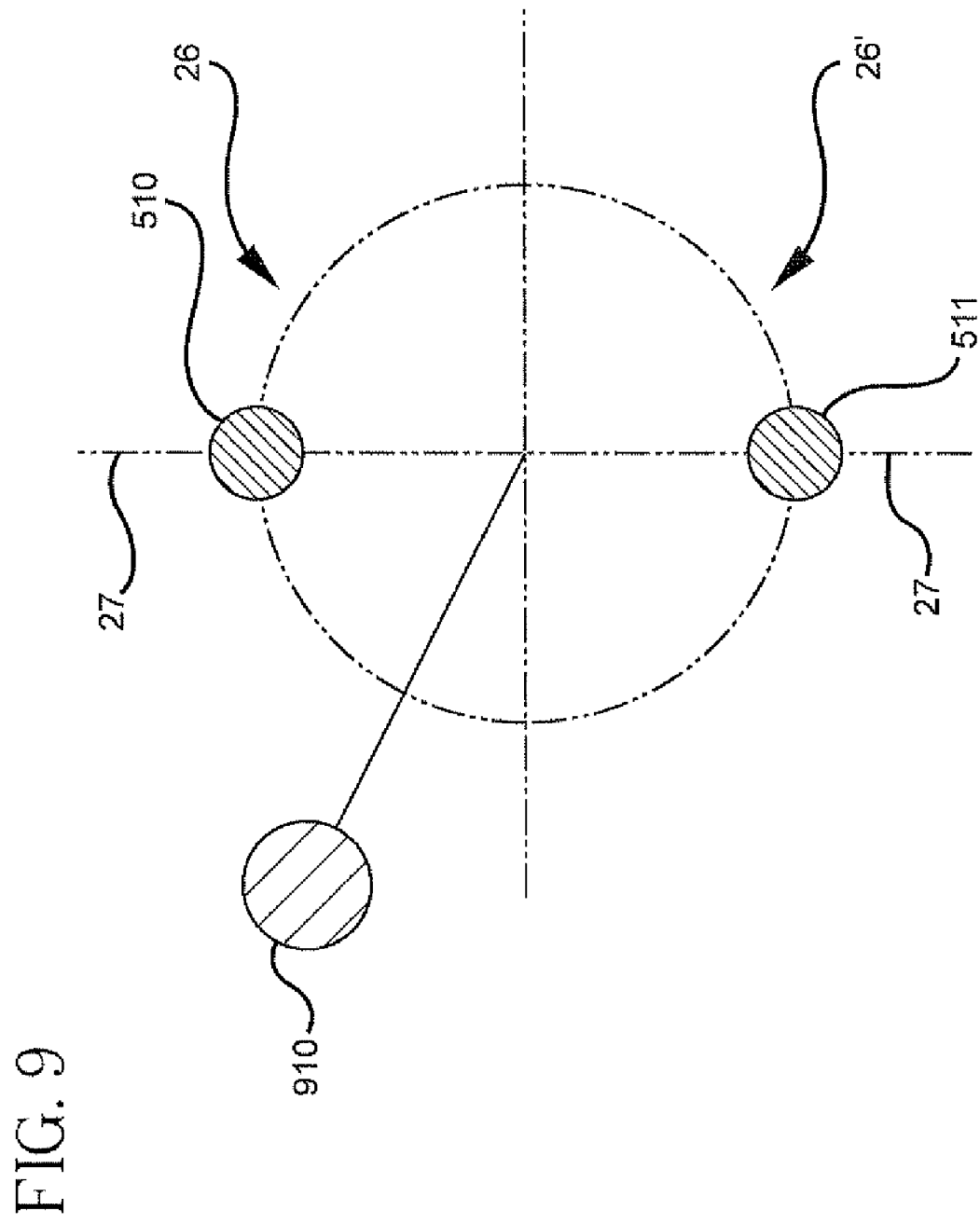
FIG. 9 is a diagrammatic representation of an initial neutral balancer configuration on an unbalanced machine.
Figure 10:
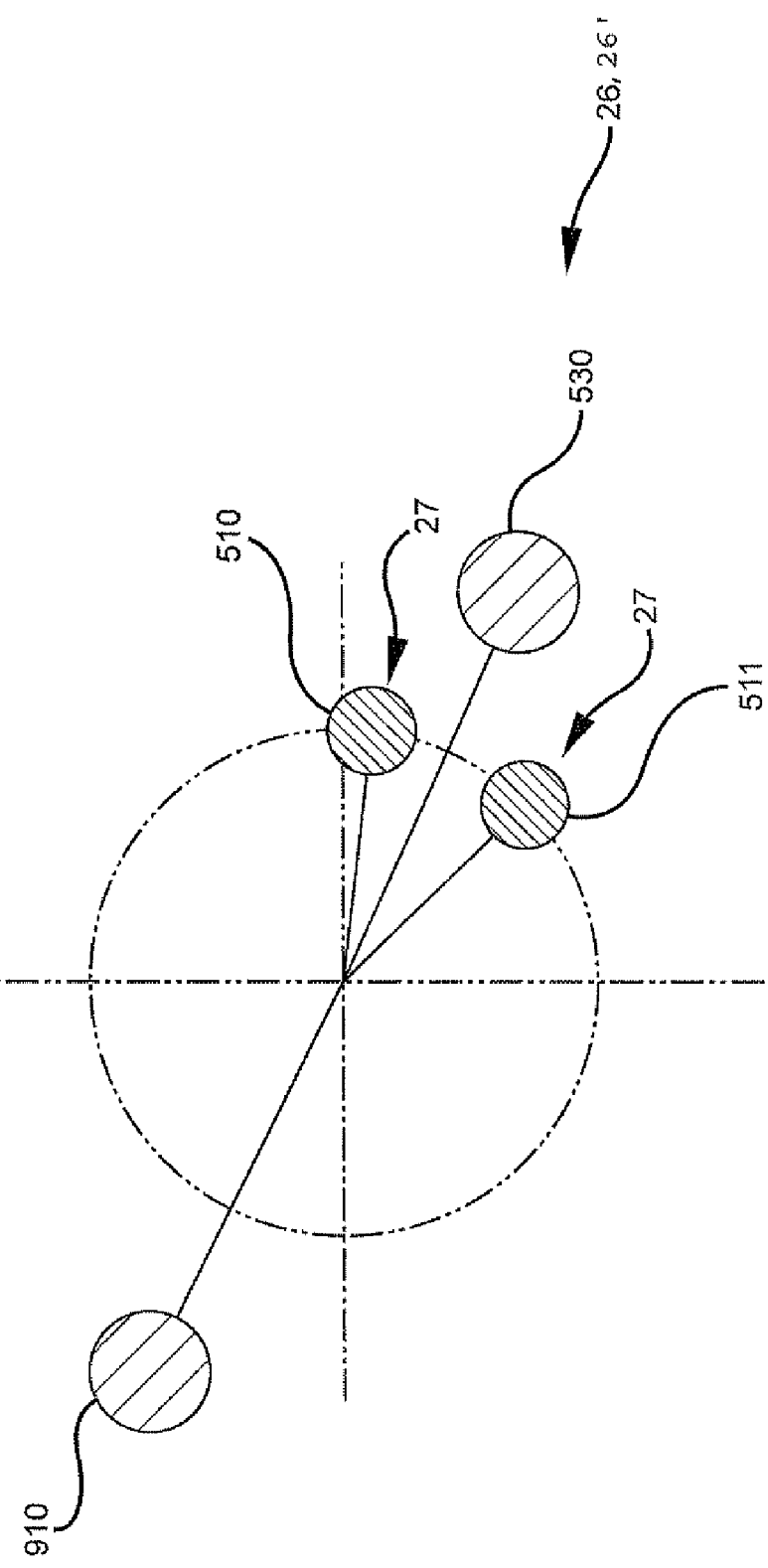
FIG. 10 is a diagrammatic representation of how, after balancing, the rotor unbalances combine to correct machine unbalance.

It should be realized that, to allow for maximum balancing capacity, active balancer 21 should be balanced or "quiescent" about the machine axis of rotation except for the resultant moment 530 which is produced to provide the desired balance correction. Therefore, when the rotors are positioned opposite one another, the balancer rotating assembly, should be in static balance. FIG. 9 shows a diagrammatic representation of just such a "neutral" balance configuration. The rotor unbalances 510-511 can be initially positioned 180 degrees opposite each to provide no effective balance correction. As will be discussed later, the controller 140 estimates the machine unbalance 910. The controllable position counter weight rotors 350-351 and their respective heavy spots 510-511 are then rotated by electromagnetic field means to the positions which provide the appropriate balance correction. This condition is diagrammed in FIG. 10. The rotor heavy spots 510-511 are placed at positions 27 so that the effective balance correction vector 530 is exactly opposite in position and the same magnitude as machine unbalance 910. This condition then results in a real time dynamically balanced machine, essentially eliminating a major source of machine unbalance vibration.

Figure 11:
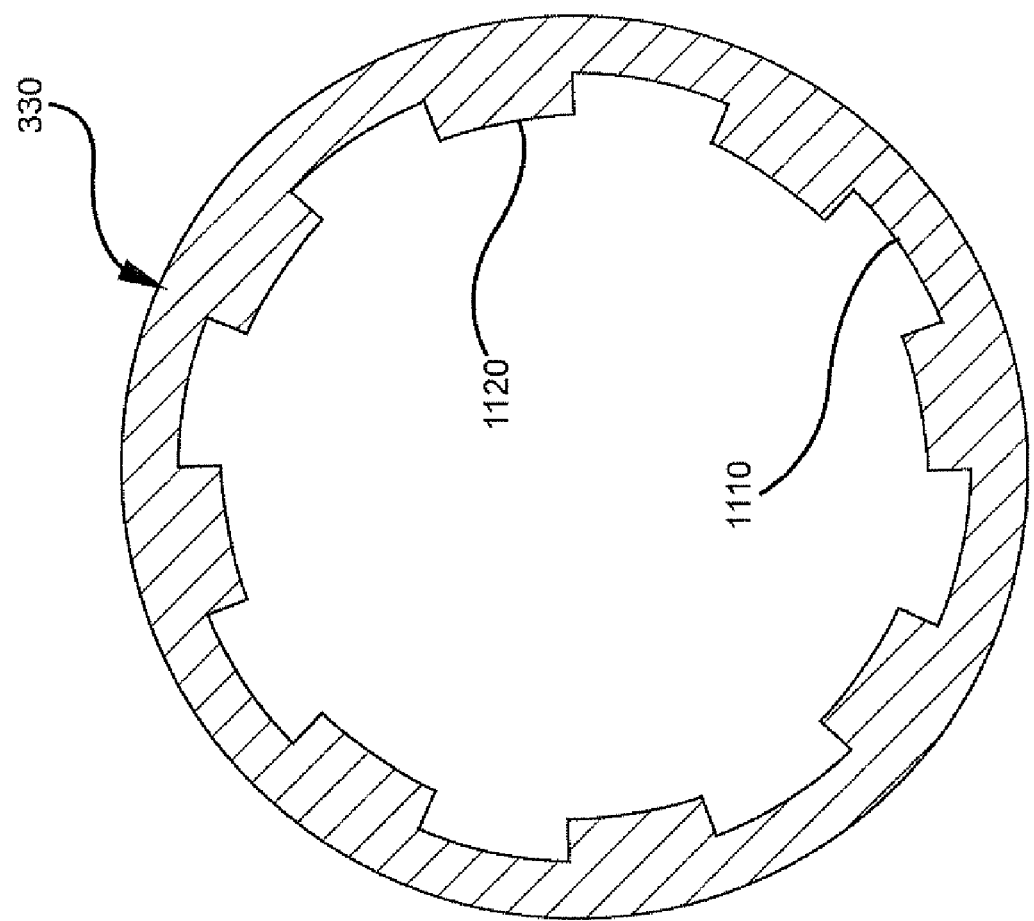
FIG. 11 is a front view of a balancer reticulated pole plate.

A front view of pole plate 330 is shown in FIG. 11. Pole plates 330-332 are comprised of magnetic material. In a preferred embodiment of this invention they have a slightly larger outer diameter than rotor 350 and further have generally rectangular flanges or reticulated notches 1110 which are equally spaced around the inner circumference of the pole plate 330. The circumferential width of the notches are the same as the circumferential width of the protruding material 1120 which lies or is positioned between each notch. The pole plate reticulated notches 1110 normally cooperatively, frictionlessly, and magnetically receive the permanent magnet-containing rotor 350. The notches function to channel the permanent magnets' field so as to hinder the controllable position counter weight rotor from rotating. This effect means that the balancer controllable position counter weight rotors will resist "slip" even when unpowered by an external source, allowing the balance state to remain unchanged even when the rotating machine undergoes significant rotational acceleration.

Figure 12:
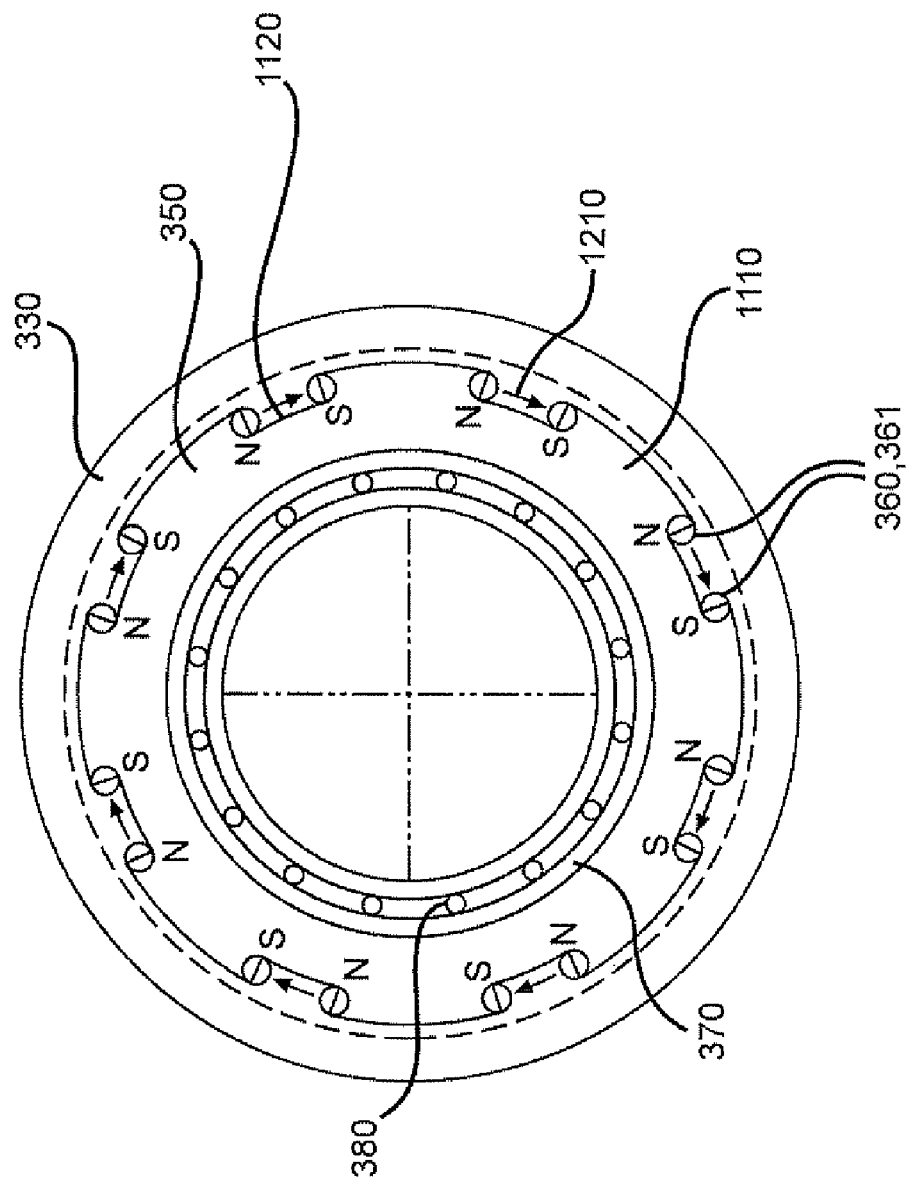
FIG. 12 is a front view of a balancer assembly showing the alignment of rotor permanent magnets with a reticulated pole plate at a detent position of the rotor.

FIG. 12 shows the stable equilibrium position of the controllable position counter weight rotor 350 with its permanent magnets 360-361 aligned with the edges of each pole plate notch 1110. Note that the magnets are mounted with alternating polarity. The arrows 1210 in the figure represent the path of magnetic flux from one magnet across the pole plate protrusion 1120 to the adjacent magnet. As is further shown in FIG. 13, a cross-section of a single magnet pair and pole plate protrusion pair, the permanent magnet pair 360-361 normally drives a magnetic circuit formed by facing plate protrusions 1120-1121 and permanent magnet pairs 360-361. The magnetic circuit flux lines 1210 are represented by arrows in FIGS. 12 and 13. The configuration of magnets 360-361 relative to the pole plate protrusions 1120-1121 represents the stable equilibrium position of the rotor. Since magnetic circuit reluctance is minimized in this rotor position, any angular perturbation of the rotor will result in a torque on the rotor acting to restore it to the stable equilibrium position and, therefore, resist rotor slip.

While the geometric shape of the notches is generally rectangular, it should be realized that other shapes are possible and/or desirable, including circular or elliptical shapes. In a preferred embodiment, there are 16 such notches and the pole plates are separated from the rotor surfaces by about 0.10 inch. In a preferred embodiment, the middle or center pole plate 331 has notches similar to the other two pole plates 330 and 332. In another embodiment, plate 331 has no notches and could be a solid piece of magnetic material such as structural steel. The absence of notches in the center pole plate 331 would decrease the maximum resistance to rotor slip by approximately two times.

When the active balancer driver 120, 220 is energized, a time-varying magnetic field is induced in the pole plates 330-332 and magnets 360-361. In a preferred embodiment, each of the pole plates 330, 331, and 332 are made of steel or a steel laminate to reduce eddy current losses due to this time-varying magnetic field. It is the permanent magnet flux circuit 1210 which is selectively interrupted by this driver flux, causing movement of the magnets and rotors.

Figure 14:
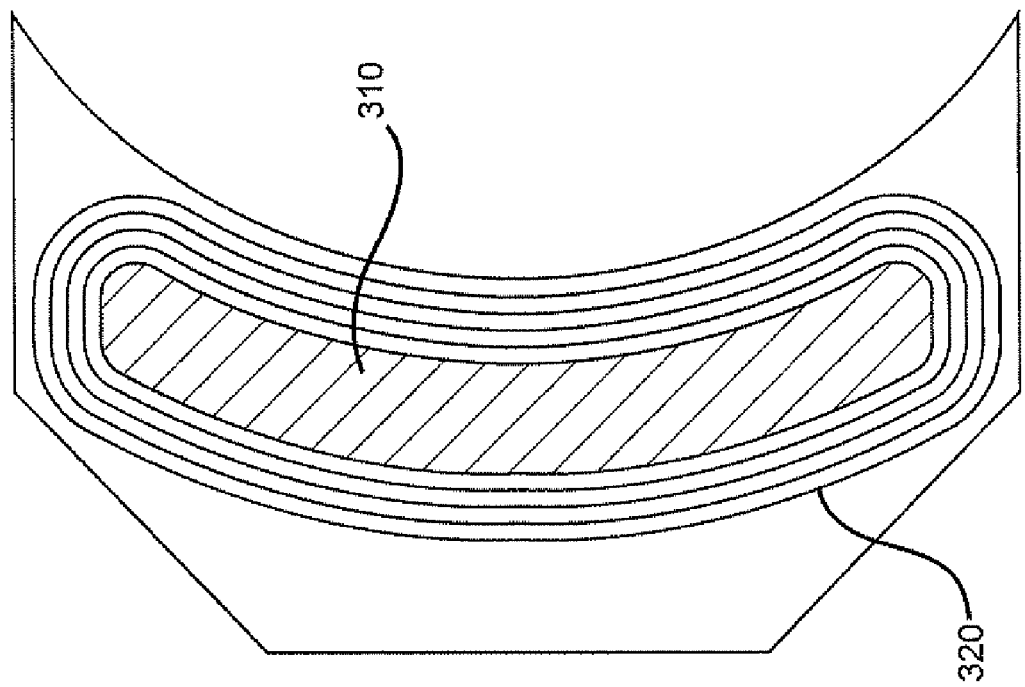
FIG. 14 is a front and partial cut-away view of an active balancer driver.
Figure 15:
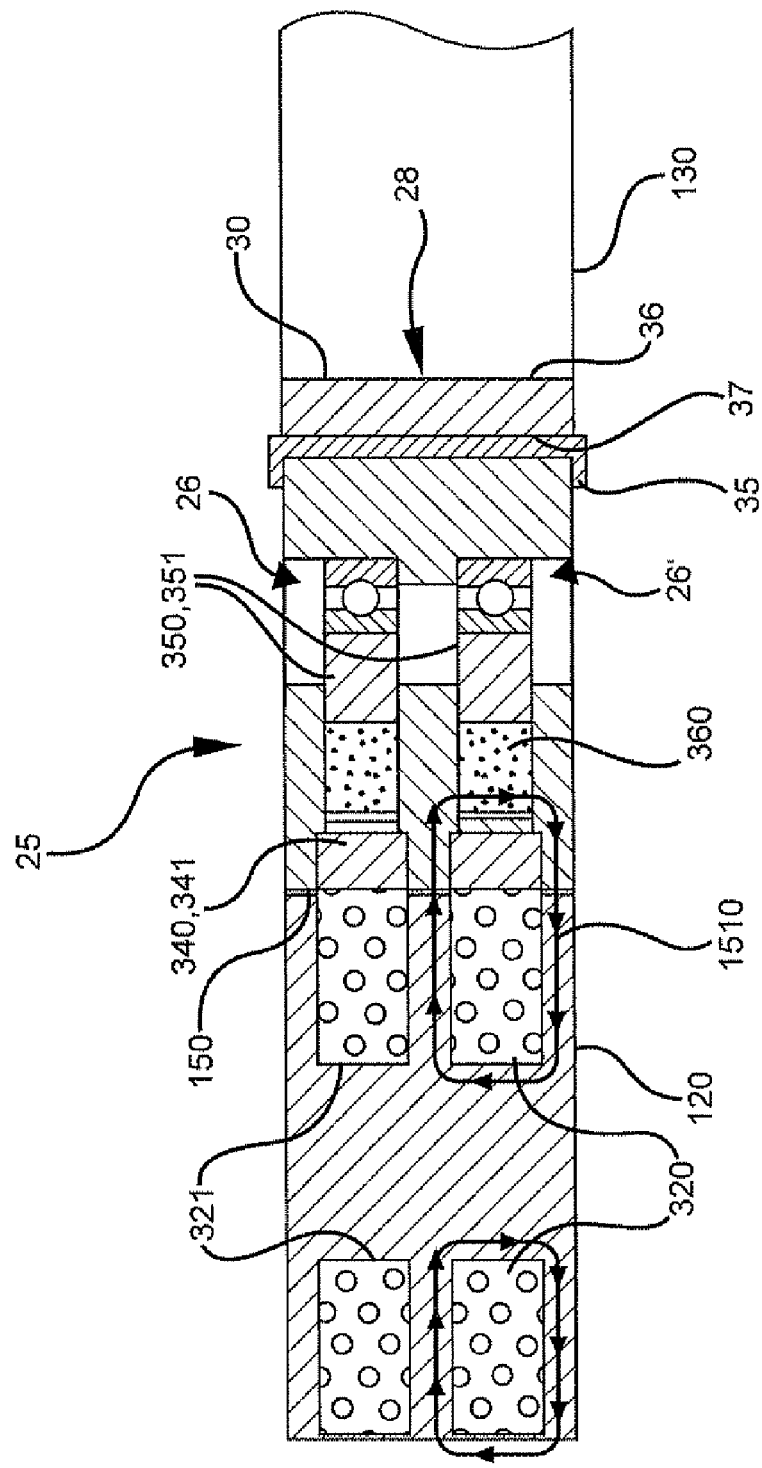
FIG. 15 is a side and partial cut-away view of a balancer and driver showing the driver magnetic field flux path.

FIG. 14 shows a side cross-section view of the "C" shaped side-mounted driver 120. The side-mounted driver 120, in one embodiment of the invention, is be about 1.5-2.0 inches thick in the direction radially away from the machine centerline and approximately the same axial thickness as the balancer rotating assembly 130. This view further illustrates the way that the driver coil 320 is wound around the driver core 310. When the coil is energized, magnetic flux is generated. FIG. 15 is a cross-section view similar to FIG. 2B, but showing the magnetic flux path 1510 generated when a single coil winding 320 is energized. The magnetic flux crosses the air gap 150 between the side-mounted driver 120 and the balancer rotating assembly 130, and passes through the permanent magnets 360. Each coil winding 320-321 can be independently energized, effecting magnetic circuits passing through either rotor 350-351.

Figure 16:
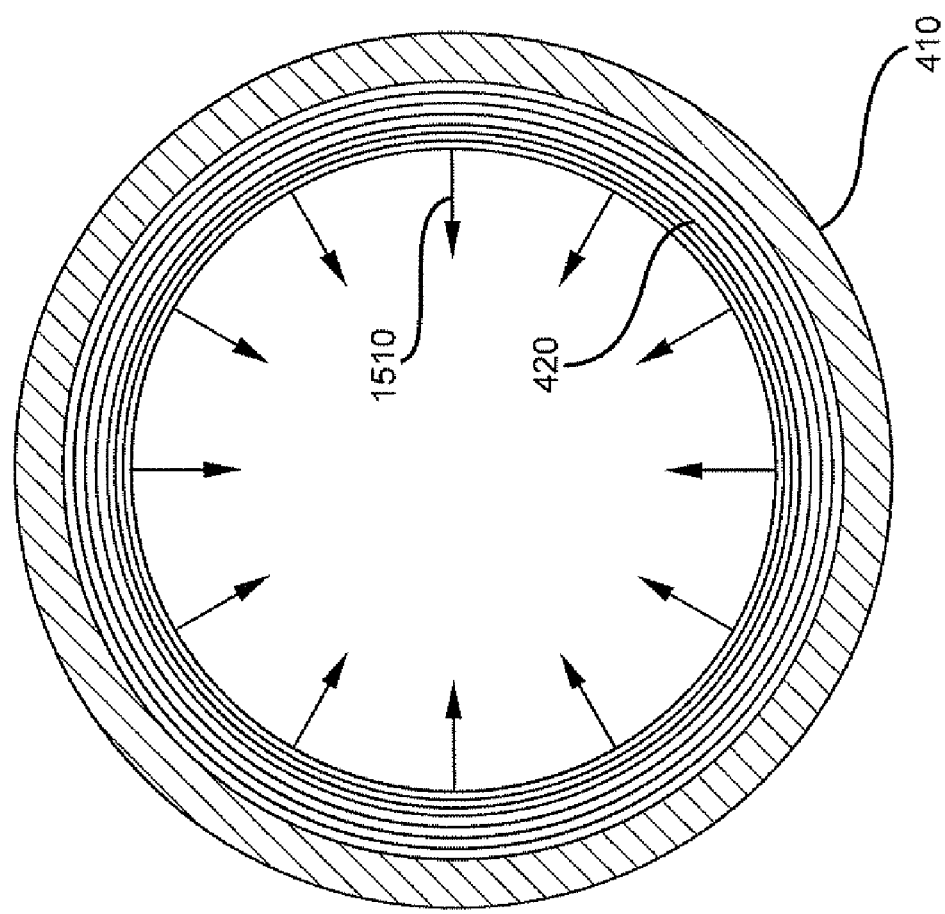
FIG. 16 is a front and partial cut-away view of a balancer driver.
Figure 17:
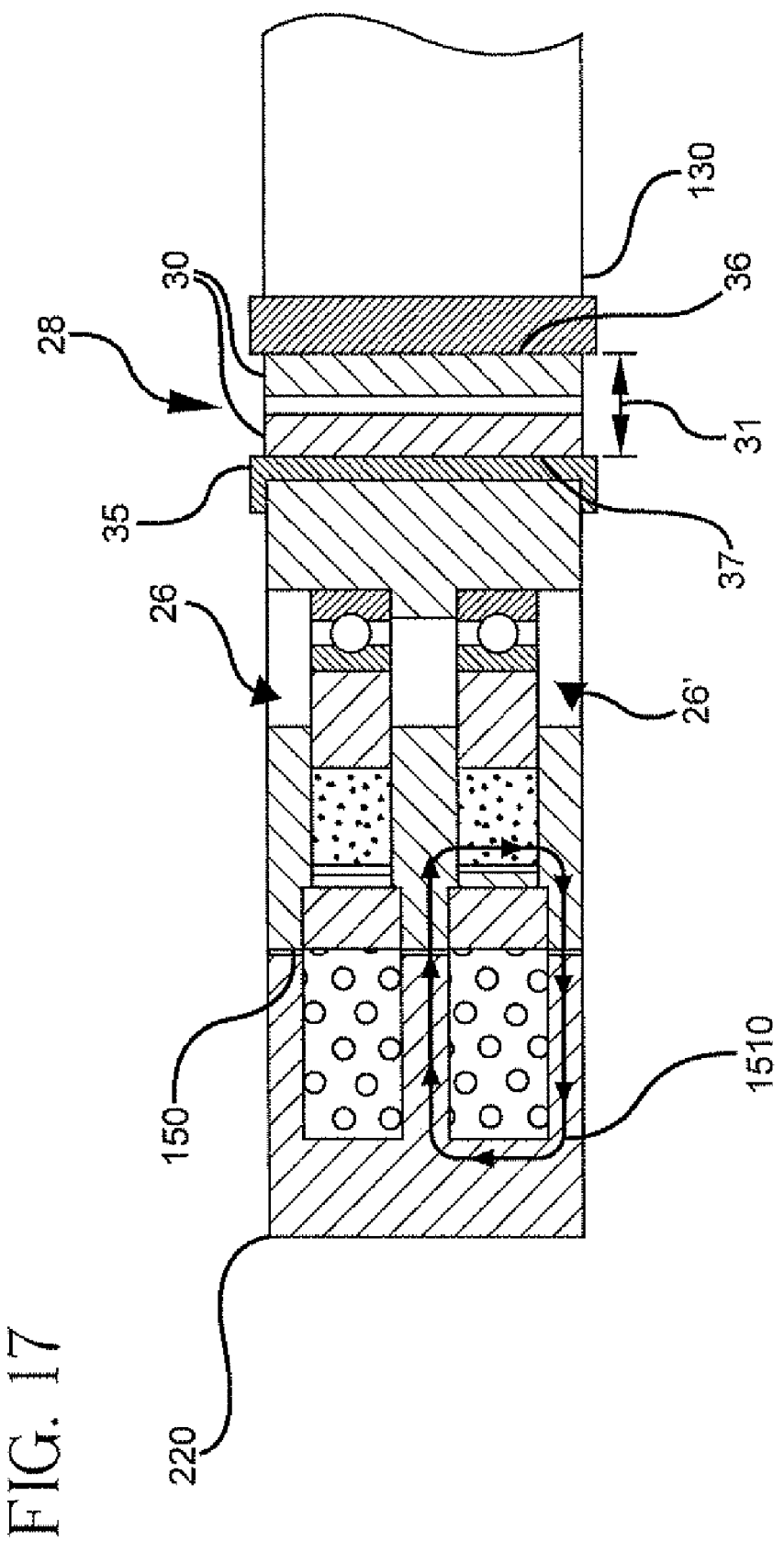
FIG. 17 is a side and partial cut-away view of a balancer and driver showing the driver magnetic field flux path.
Figure 21:
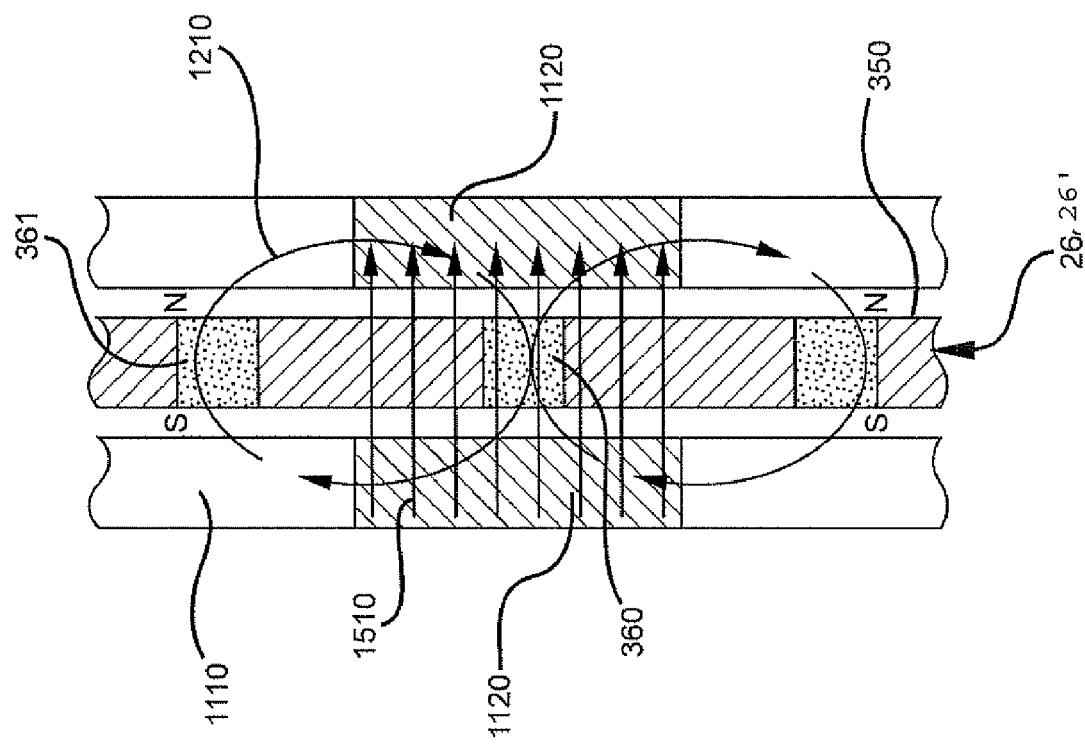
FIG. 21 illustrates the driver magnetic field and the permanent magnet field when the rotor is at an unstable equilibrium mid-detent position.

Since a portion of the total magnetic flux is induced to pass through the air away from the balancer body 25, the side-mounted driver 120 is less efficient electromagnetically than the concentric driver 220. Furthermore, since approximately the same magnetic flux must pass through a smaller volume of core in the side-mounted driver than the concentric driver, there is a greater chance of magnetic saturation in the side-mounted driver core material. Therefore, the concentric driver is more desirable in applications which, because of geometric or other constraints, do not require the side-mounted driver configuration. A cross-section view of the concentric driver 220 is shown in FIG. 16. Also shown are the magnetic flux lines 1510 induced by the drive coil 420 parallel to the plane of the page. The concentric driver core 410 is, in one embodiment of the invention, about one inch thick in the radial direction and has substantially the same axial thickness as the balancer rotating assembly 130. The corresponding section view of the concentric driver 220 interacting with the balancer rotating assembly 130 is shown in FIG. 17. Note that the flux path 1510 crosses to the rotating assembly 130 and through the permanent magnets similar to that shown in FIG. 21. The concentric driver 220 is more efficient electromagnetically, however, than the side-mounted driver 120 since a greater percentage of the total magnetic flux is able to interact with the permanent magnets.

Figure 13:
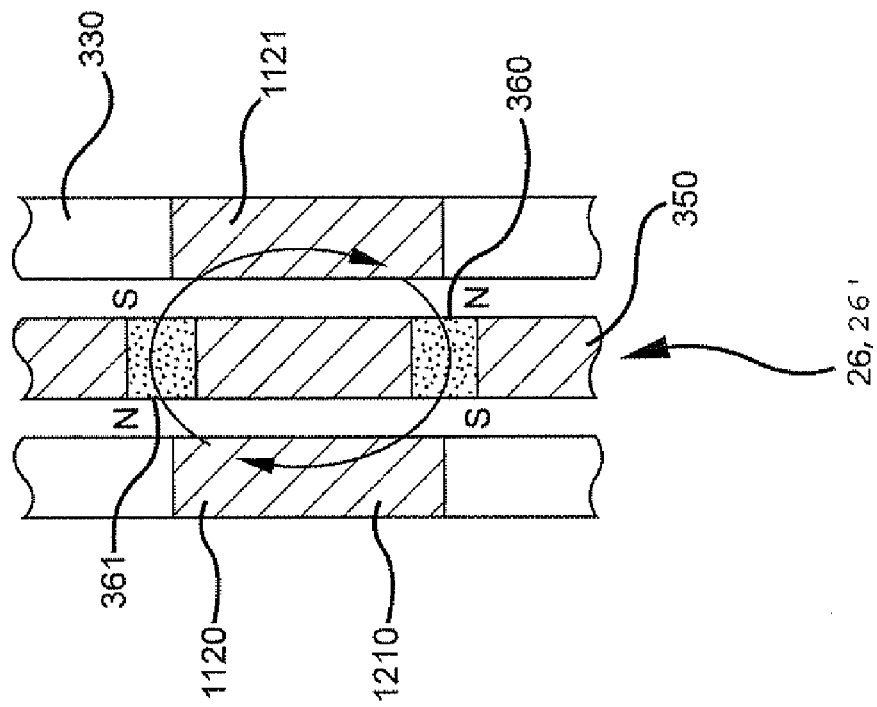
FIG. 13 is a partial cut-away view of the pole plates and rotor seen in FIG. 12 showing the permanent magnet flux path.
Figure 18:
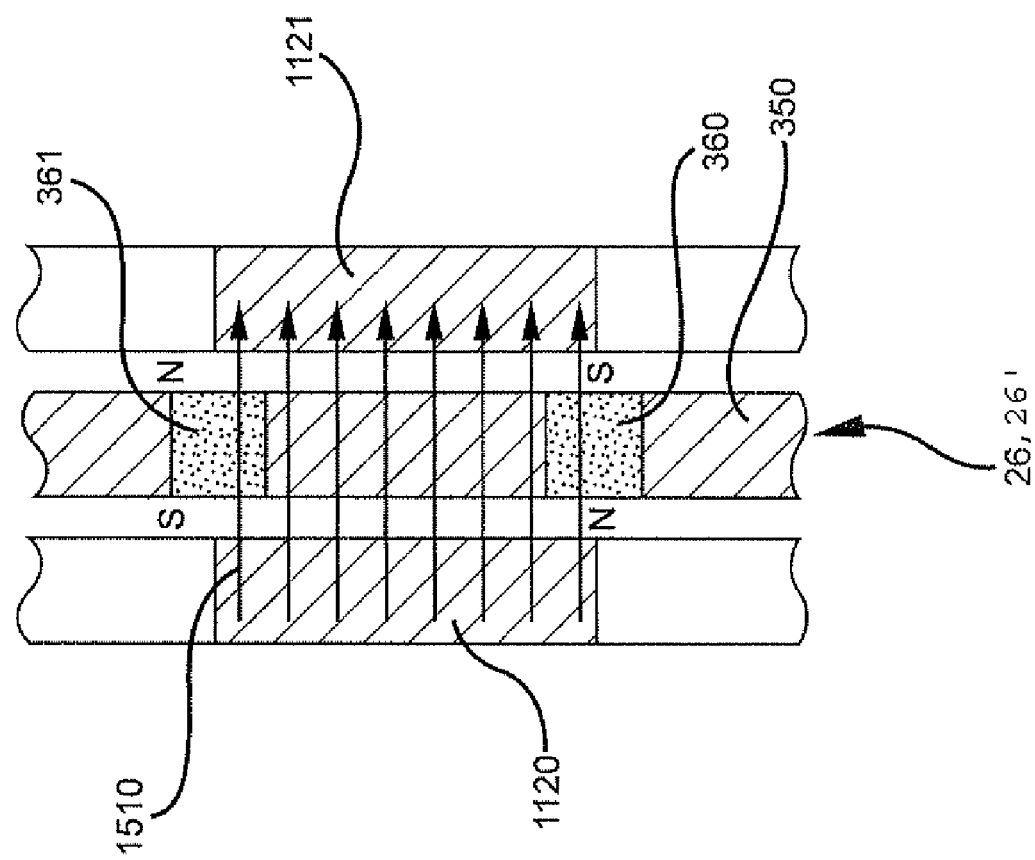
FIG. 18 shows an additional view of a driver magnetic field flux path.
Figure 19:
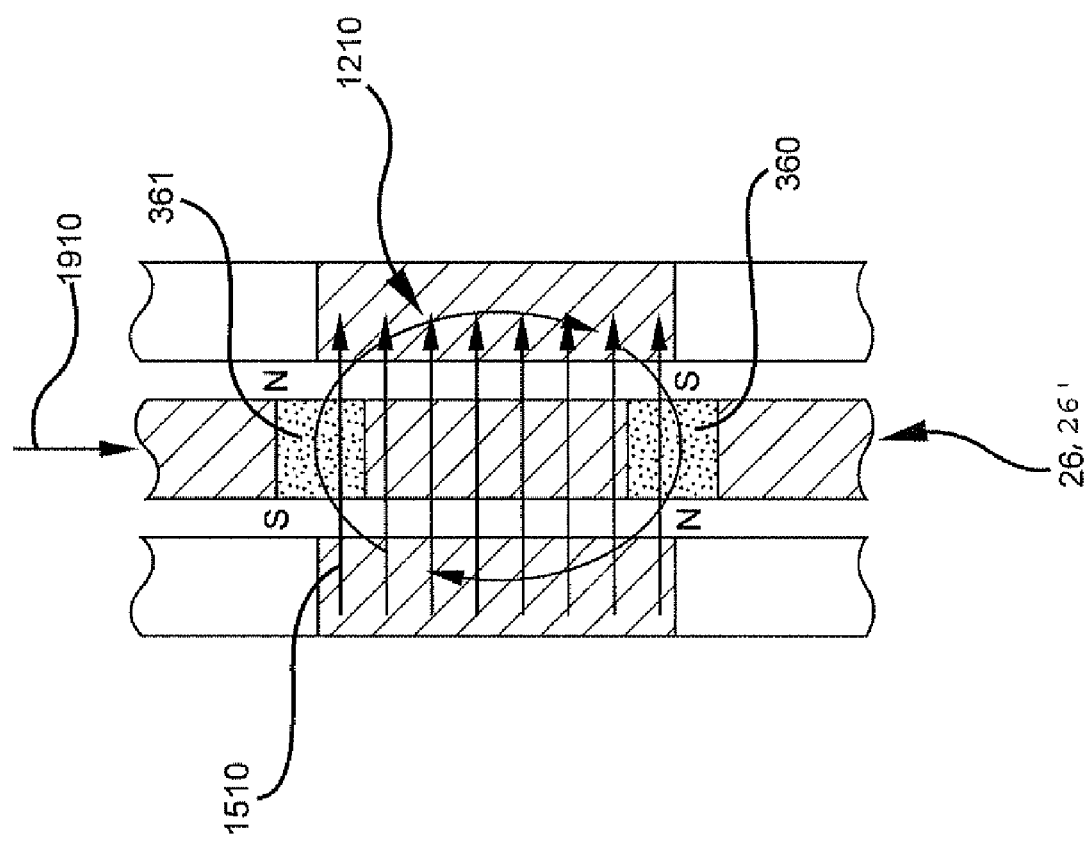
FIG. 19 illustrates the interaction of the driver magnetic field and the permanent magnet field.
Figure 20:
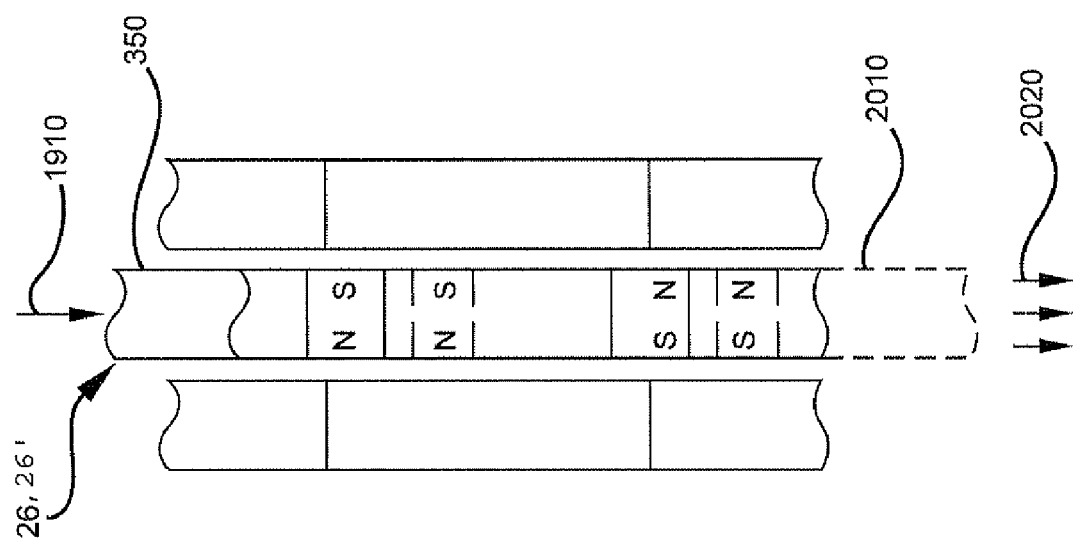
FIG. 20 shows how the rotor moves in the direction of the electromagnetically-generated actuation force.

FIG. 18 shows a section view similar to FIG. 13. FIG. 18, however, shows the flux path generated by either of the drivers 120 or 220. Magnetic flux 1510 flows between pole plate protrusions 1120 and 1121 and across the non-magnetic rotor 350 and permanent magnets 360-361. In FIG. 19, the magnetic flux 1510 from the driver 120 or 220 is shown juxtaposed on the flux 1210 due to the permanent magnets 360-361. As the two magnetic fields interact, the flux lines or fields of the upper portion of the circuit (e.g. at the bottom of magnet 361) generally cancel, but the flux lines or fields at the top of magnet 360 are additive. Such field interaction creates a force 1910 on the rotor in a direction perpendicular to the driver-generated magnetic field. This force is generated because the rotor is attracted to a position which maximizes magnetic flux density while minimizing magnetic reluctance. Such a position is found when the magnet 360 is aligned with the midpoint of a pole plate protrusion 1120 and the magnet 361 is aligned with the midpoint of the pole plate notches 1110. FIG. 20 illustrates the intermediate new position 2010 of rotor 350 as it moves in the direction 2020 of the electromagnetically-generated actuation force 1910. Once the driver field is removed, a mid-notch position becomes unstable. Thus, the dynamics of the rotor are governed by the forces caused by the interacting driver and permanent magnetic fields when the driver is energized, and when the driver is not energized, the permanent magnets alone, which tend to restore the rotor to a stable equilibrium position. This stable position is where the magnets are aligned with the edges of the pole plate notches as shown in FIG. 12.

It is theoretically possible that, in rare situations, the rotor may become "stuck" in an unstable equilibrium position.

FIG. 21 again shows that driver magnetic field 1510 and permanent magnet field 1210 as in FIG. 19. The rotor, however, is in a "mid-detent" position where the magnets 360-361 are aligned with the midpoint of the pole plate notches 1110 or protrusions 1120. Since the rotor is already at the stable equilibrium for the energized coil condition, there will be no torque on the rotor due to the driver coil field. When the driver coil is not energized, the rotor is then in an unstable equilibrium position. There will be no net torque on the rotor as long as it remains exactly at the "mid-decent" position. If the rotor is perturbed from the position, however, it will rotate to a stable equilibrium where its magnets are aligned with the edge of a pole plate notch. The greater the "Coulomb" or "dry" friction in the rotor bearing, the greater the possibility of the rotor becoming stuck at the mid-detent position. Therefore, it is advantageous to minimize the amount of dry friction in the rotor bearing. If the rotor were to become stuck, the balancer could be rotationally accelerated to nudge the rotor enough to cause it to return to the stable equilibrium position. Furthermore, in many cases, a small driver coil excitation pulse could be used. Given that there would be small imperfections and asymmetries in the permanent magnet and pole plate material, a small pulse could generate a small torque on the rotor to displace it from the unstable equilibrium. As will be discussed later in this document, however, it is also advantageous to have a certain amount of viscous fluid friction present to act on the rotor. First, however, an understanding is required of how electrical pulses through the driver coil cause the rotors to move.

The driver excitation pulse, in preferred embodiments, is relatively brief in duration and is on the order of time that it takes for the rotor to move from one reticule to the mid-reticule position. Beyond this position, the coil driver-induced force acts in an opposite direction, attempting to return the rotor to the mid-detent position. The electrical pulse must be of the appropriate magnitude and duration to cause a torque which will impart the rotor momentum required to allow the rotor to step into the next detent position and not beyond. The change in momentum of the rotor is caused by imparting an impulse.

Figure 22:
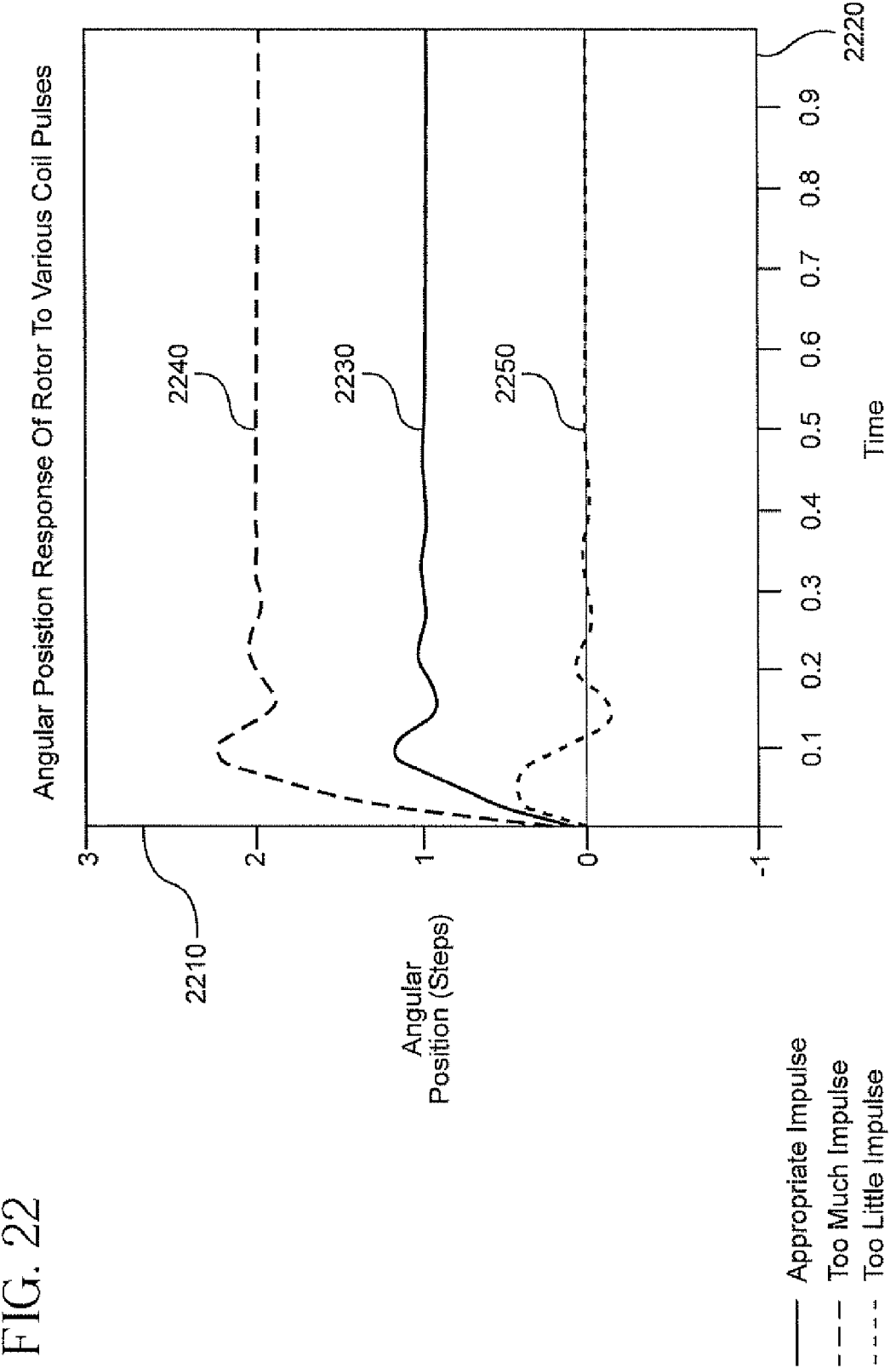
FIG. 22 is a graph of balance rotor angular position with respect to time showing a rotor response to three different driver coil energy pulses.

If not enough impulse is provided, the rotor will settle again into its original position. If too much impulse is furnished, the rotor will have too much momentum and will skip a detent. An example of each of these cases is shown in FIG. 22. The plot shows the rotor angular position 2210 on one axis versus time 2220 on the other axis. The impulse provided by the driver coil current should reliably cause the rotor to step one position such as the "just right" case 2230 shown in FIG. 22. Curve 2240 is the rotor response after "too much" impulse has been applied by the driver to the rotor. Curve 2250 shows how the rotor will simply settle back into its original position when not enough impulse is supplied. Since each balancer may have different rotor inertial characteristics, durations and magnitudes of the coil pulses will need to be modified for each balancer design.

In one embodiment of the invention, viscous fluid would be sealed inside the balancer rotating assembly. This fluid would provide viscous frictional damping to the rotors. The presence of viscous friction, while increasing the required coil energy to actuate the rotor, also increases the reliability of rotor actuation by allowing a wider range of driver impulses to cause successful rotor actuation. In the absence of any friction, the rotor would, upon actuation, continue to move forever since no energy would be lost from the system. Friction, therefore, is required to remove energy from the rotor, causing it to settle in the next detent position without overshooting to the following step position. "Dry" friction is not desirable because of the tendency for it to increase the probability of the rotor getting "stuck" as discussed above. Viscous, or "wet" frictional damping provides a torque on the rotor as a function of rotor angular velocity. This would not cause the rotor to "stick" in its unstable equilibrium position. There is a range of impulse magnitude which would actuate the rotor successfully into the next detent position without causing it to "skip" a step.

Figure 23:
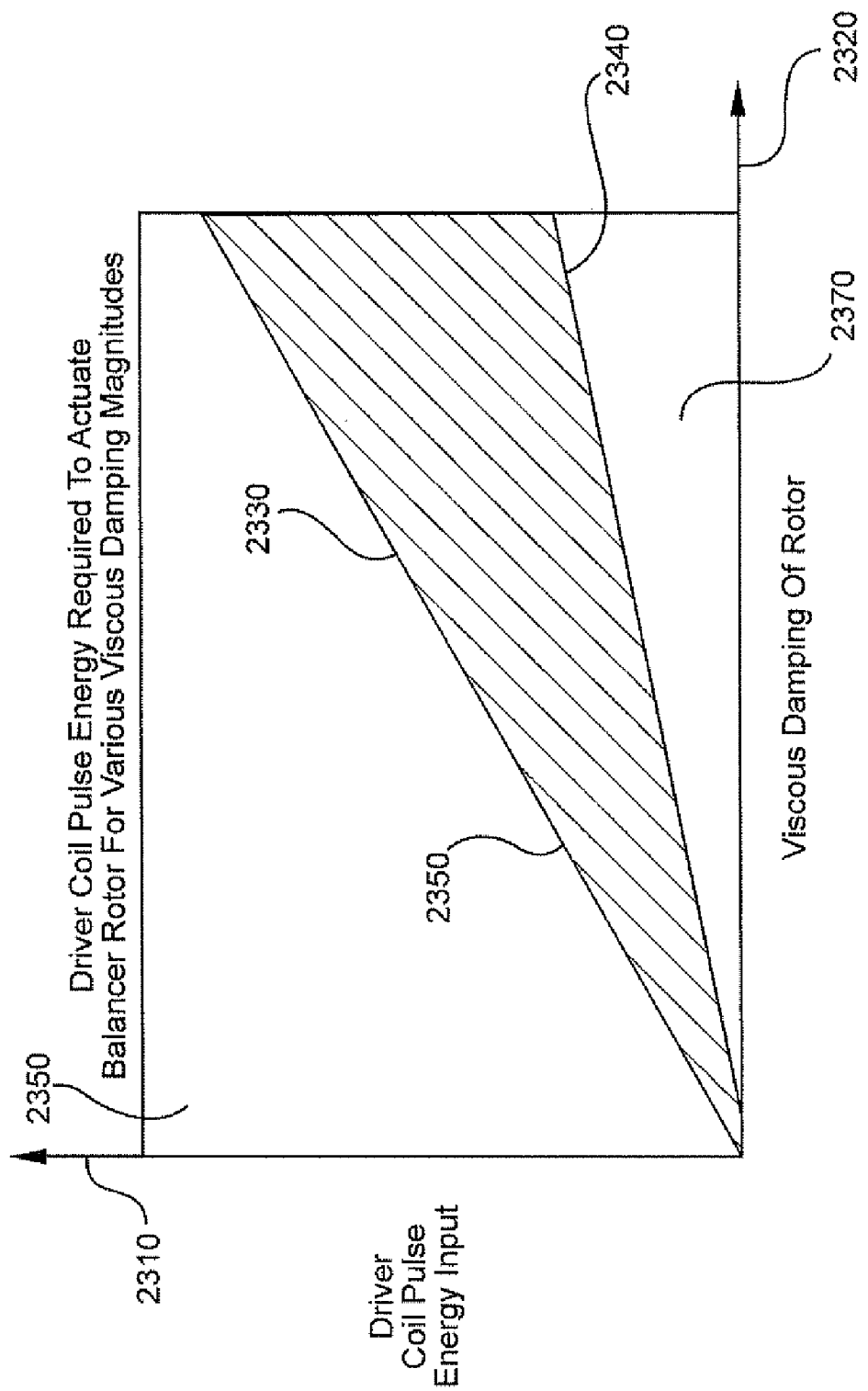
FIG. 23 is a graph of driver coil pulse energy versus viscous damping of a balancer rotor showing the range of driver coil pulse energies that will cause successful actuation of the rotor for varying viscous damping values.

Increasing viscous damping increases the range of impulses allowable and increases balancer reliability by making operation less sensitive to environmental and manufacturing variations. Increased reliability, however, comes at the cost of increase energy required since viscous friction dissipates energy from the system. FIG. 23 diagrams how increasing viscous damping increases the acceptable range of energy input. The figure shows a plot on axes of driver coil pulse energy input 2310 versus viscous damping of rotor 2320. Curves 2330 and 2340 represent the respective maximum and minimum driver coil pulse energy inputs which will cause successful rotor stepping. The area 2350 lying between the maximum 2330 and minimum 2340 curves represents the range of driver pulse energies which will cause successful rotor stepping. The areas 2360 and 2370 above below this range represent energies which will cause rotor "over-stepping" and "under-stepping" respectively. Note that the range 2350 of "allowable" energy inputs increases with increasing viscous fluid damping. Energy required for stepping, however, also increases with increasing viscous damping because damping dissipates system energy.

An appropriate trade-off between reliability and energy input required must be determined given the specifications of each balancer application. Once the appropriate compromise is defined, the viscous damping can be set by choosing the appropriate viscosity fluid.

Fluid viscosity is often highly temperature dependent. It is possible, therefore, that the balancer would operate less reliably in a relatively high temperature environment. In one embodiment of the invention, temperature sensors would provide feedback of the fluid temperature. Temperature-viscosity tables, determined experimentally a priori, would then be used to decrease driver coil pulse energy appropriately as temperature increased to allow continued reliable balancer operation.

Figure 24:
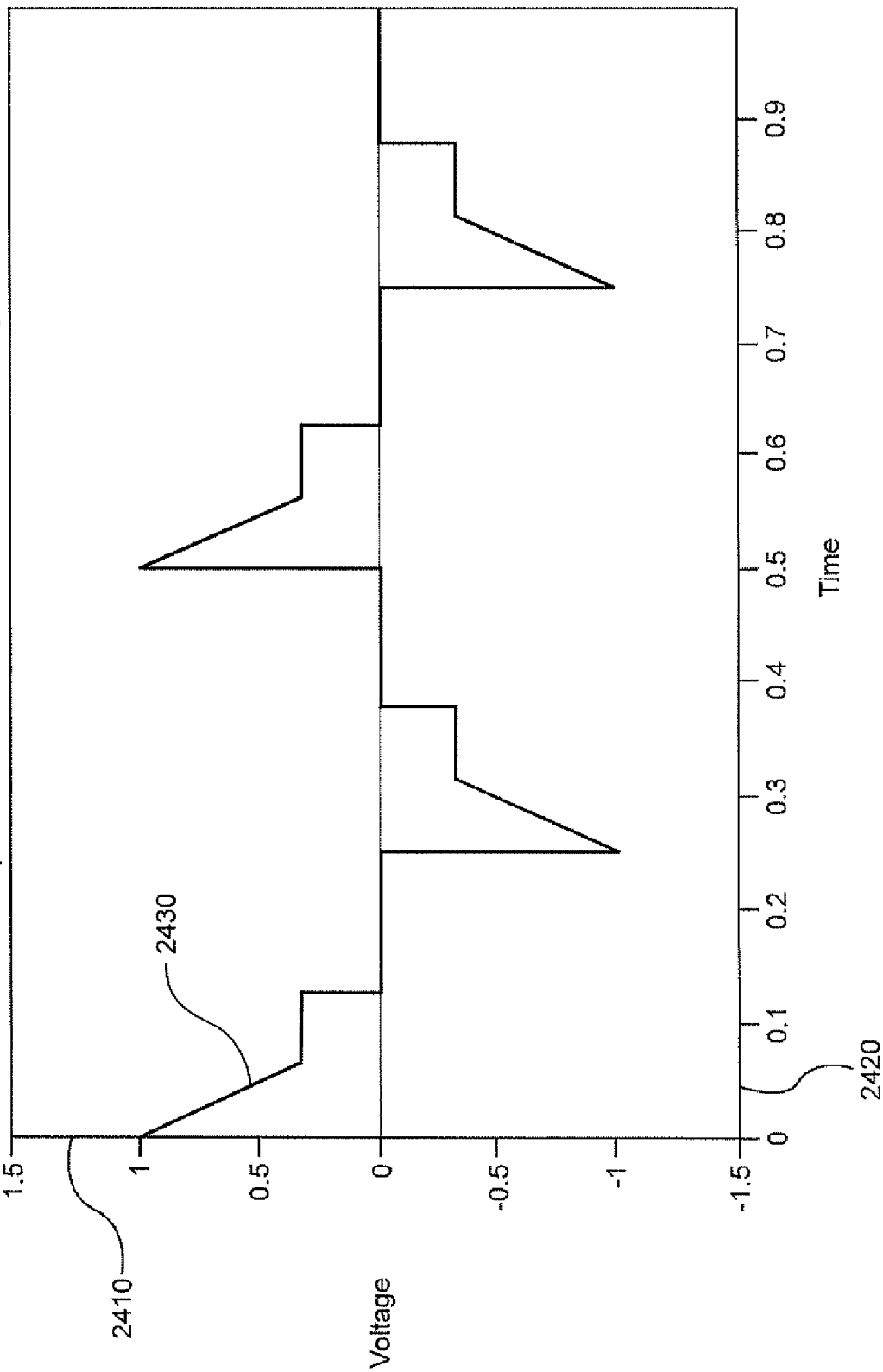
FIG. 24 is a graph of driver coil voltage versus time.
Figure 25:
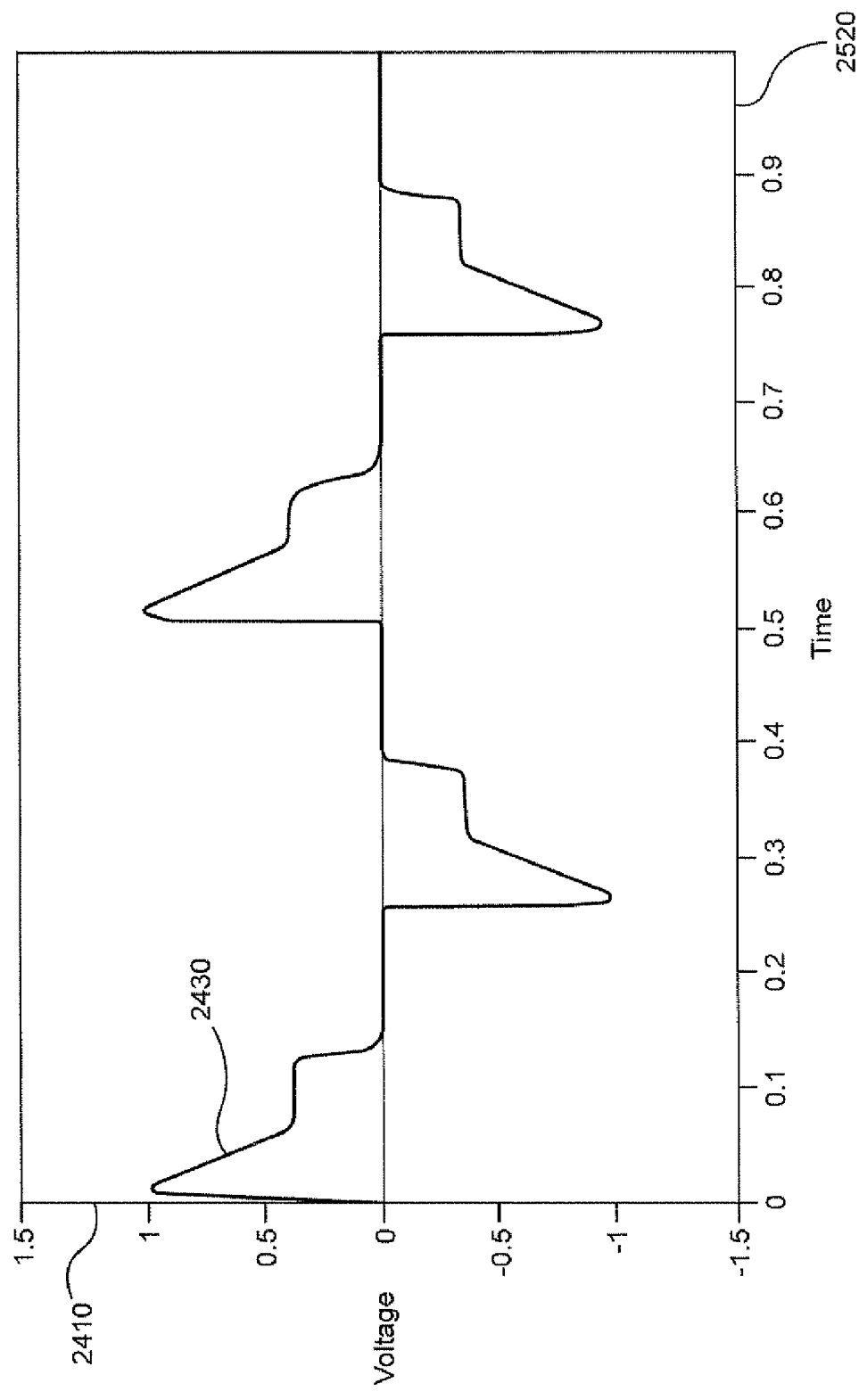
FIG. 25 is a graph of driver coil current versus time.

To obtain rotor actuation in a single direction for each step, the polarity of the driver pulses must be alternated. FIG. 24 shows an example of the "shape" of voltage pulses through the driver coil. FIG. 24 is a plot with voltage 2410 and time 2420 axes. Four driver voltage pulses 2430 are shown. Each pulse would cause the rotor to move one step. Note that the pulses indeed alternate in polarity to cause continued actuation in the same direction. FIG. 25 shows a plot on axes of current 2510 versus time 2520. The resulting driver coil current 2530 due to the voltage pulses is shown. The "rise-time" and decay characteristics of this current will, as should be apparent to one of ordinary skill in the art, be a function of applied coil voltage and coil impedance.

It should be known to those of ordinary skill in the art that the required amplitude of the driver pulse is nearly proportional to the square root of the restraining force, or slip resistance created by the magnetic engagement of the rotor magnets and pole plate notches.

Figure 26:
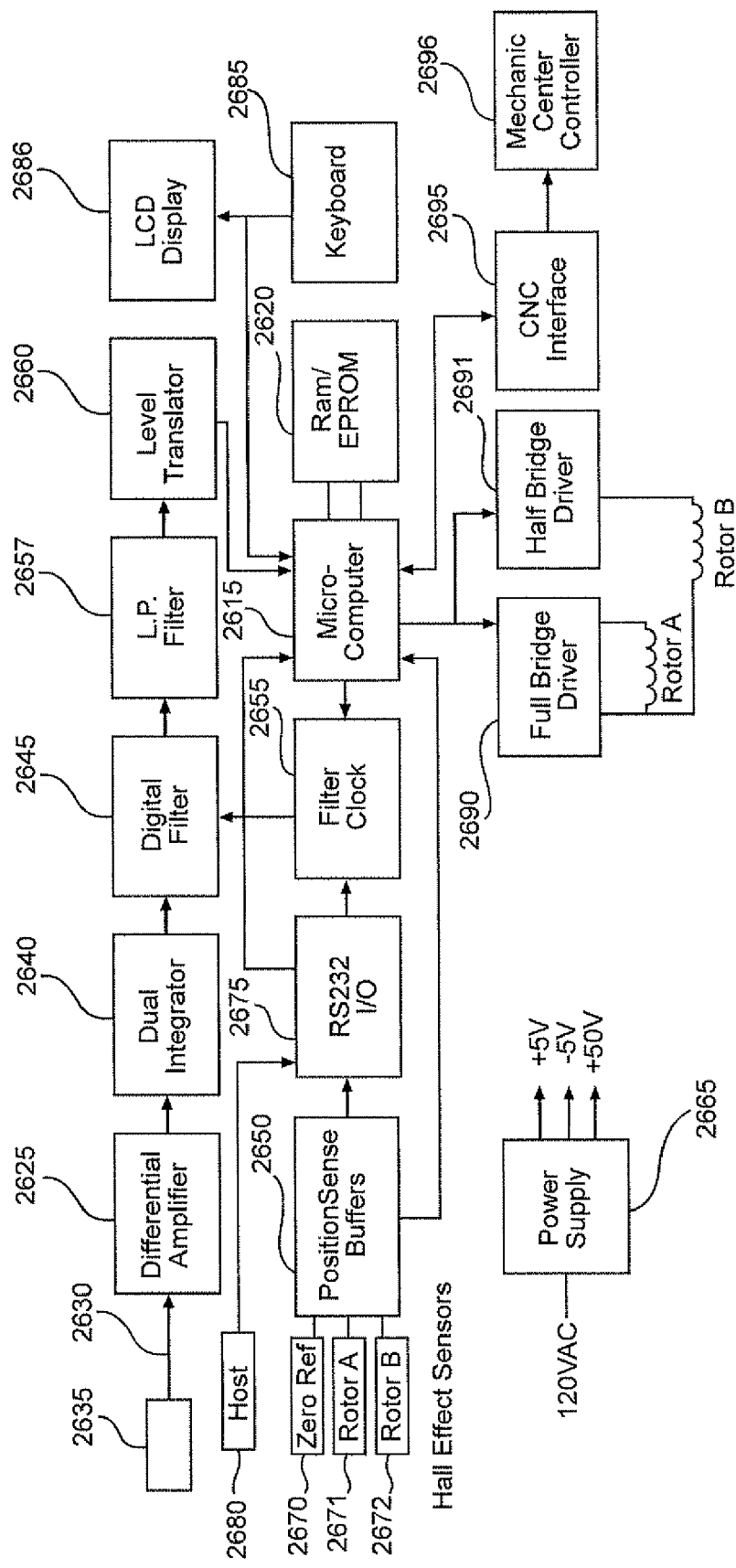
FIG. 26 is a block diagram of a balancer controller/power driver electronics.

Thus, in the preferred embodiment of this invention each rotor can be selectively actuated to the appropriate position to provide machine unbalance compensation To understand the real time dynamic balancing control techniques used, reference is now made to FIG. 26. FIG. 26 shows controller 140. Specifically, controller 140, includes a microcomputer 2615 comprised of a Model 80C196KC, produced and commercially available from Motorola Corporation of Austin, Tex. Microcomputer 2615, as should be apparent to those of ordinary skill in the art, includes a sixteen bit central processing unit which is adapted to perform "on-line" needed calculations and a ten bit analogue to digital converter which is used to digitize the analogue vibration signals received by the microcomputer 2616. The microcomputer 2615 also includes three edge sensitive timers which are adapted to measure the pulse duration of signals received from the position sensors and a pair of parallel ports which are used to communicate with a display or keyboard. Lastly, microcomputer 2615 includes a serial port of the RS-232C type. In an embodiment, all of the control algorithms which will be discussed are computed and performed within microcomputer 2615.

As further shown in FIG. 26, controller 140 further includes a memory module, 2620 which is communicatively coupled to microcomputer 2615 and comprised of a Model PSD301, which is produced by and commercially available from WSI Corporation. Specifically, memory 2620 includes, about 32K bytes of read only type memory and about 2K bytes of random access type memory. In the most preferred embodiment of this invention, all of the software programs which are used to define the operation of controller 140 are stored in memory 2620, including all of the software variables.

Controller 140, as shown in FIG. 26, also includes a differential amplifier 2625 which, in the preferred embodiment of this invention, is comprised of a model TLC2201 which is commercially available from and produced by the Texas Instruments Company of Austin, Tex. Amplifier 2625 is adapted to receive signal 2630 from either a velocity or acceleration transducer sensor 2635. Sensor input signal 2630 is therefore indicative of the amount or amplitude of the measured vibration. Differential amplifier 2625 receives input from the sensor transducer 2635, substantially eliminating common mode type noise such as that referred to as "60 Hz hum". The amplified and conditioned signal is then output and communicatively coupled to the dual integrator 2640.

In an embodiment of the invention, dual integrator 2640 is comprised of a Model TLC 2202 which is commercially available and provided by Texas Instruments Corporation of Austin, Tex. Specifically, dual integrator 2640 receive the amplified and conditioned signal from amplifier 2625 and converts the signal to a displacement or position value associated with the shaft. The converted signal is then communicatively coupled to the digital filter 2645 which, in the preferred embodiment of this invention, is comprised of a Model MAX 260 which is commercially available from and produced by the Maxim Corporation of Sunnyvale, Calif.

In the most preferred embodiment of this invention, filter 2645 is comprised of a fourth order digital filter of the narrow band type. Specifically, this filter is adapted to have a center frequency which is directly related to the rotational speed of the rotating machine shaft which is received and discussed in reference to the buffers 2650. As shown, the filter center frequency is controlled by an output signal emanating from filter clock 2665. In fact, in the most preferred embodiment of this invention, the center frequency of filter 2645 is about 1/100 that of the frequency of the clock 2655. Moreover, the frequency of the clock 2655 is controlled by microcontroller 2615 in response to the rotational speed values that it receives. The output of this filter is received by a low pass filter 2657 which has a corner frequency of about 200 Hz. The low pass filter 2657 is communicatively coupled to the level translator 2660. In the preferred embodiment of this invention, the level translator 2660 is comprised of a Model TLC 2201 which is commercially available from and produced by the Texas Instruments Company of Austin, Tex. Specifically, level translator 2660 includes a single stage operational amplifier which is adapted to center the received vibration signal around the position corresponding to about one half of the voltage signal emanating from power supply 2665. In the most preferred embodiment of this invention, the output signal emanating from translator 2660 has a voltage level of about 2.5 volts DC in the absence of an input signal. The voltage signal emanating from translator 2660 is therefore representative of the displacement value originally obtained from the vibration or acceleration sensor transducers. This signal is communicatively coupled to microcomputer 2615 and will be used in combination with the stored software.

As further shown, controller 140 also includes a series of position sense buffers 2650 which, in the preferred embodiment of the invention, comprise commercially available models 74HC14 which are produced by the Motorola Company of Austin, Tex. Specifically, these buffers 2650 receive input signals from three Hall Effect devices 2670, 2671 and 2672, which in the preferred embodiment of the invention, comprise of commercially available model SS400 which are produced by Micro Switch (a division of Honeywell) of Freeport, Ill. The Hall Effect sensors are stationary with respect to the rotating machine and are mounted in close non-contacting proximity to the active balancer. The Hall Effect devices' 2670, 2671, and 2672 output signals are respectively representative of shaft position and the positions of rotors 350 and 351. More particularly, each of these devices or sensors 2670-1672 produces a pulse which is proportional to the length of time that the particular sensor is in proximity to the magnet targets located on the rotating balancer body 25 and each rotor 350 and 351. As should be apparent to one of ordinary skill in the art, shaft speed can be computed by counting the rate of Hall Effect sensor pulses caused by the passing rotating assembly magnetic target. Angular position of each rotor relative to the rotating assembly can then be inferred by observing the phase shift between sensor pulses caused by magnetic targets on each rotor and pulses caused by the rotating assembly magnetic target.

The output data which is temporally stored in buffer 2650 is communicatively coupled to the microprocessor 2615 to be used by the software in a manner which will be described. As further shown, controller 140 includes a communications portion 2675 which, in an embodiment of the invention, is comprised of a commercially available module or chip commonly referred to as a Model MAX232, which is produced by the Maxim Company. By use of portion 2675, microcontroller 2615 may communicate information to a typical host computer 2680 and receive information from host.

As further shown, controller 140 also includes a keyboard 2685 and display 2686 which, in the preferred embodiment of this invention, are respectively comprised of Models 74C923 and LM1200SYL components which are commercially available from and produced by the National Semiconductor Company and SCI respectfully. Specifically, keyboard 2685 is a twelve key keypad which is adapted to communicate with microcomputer 2615 to allow an operator to start, stop and control the operation of the balancer assembly 110. Display 2686 is a twenty four character by four line liquid crystal display which is adapted to present status and control information, such as vibration level, angle of imbalance, and rotor positions. Such information is received from microcontroller 2615.

As is also shown in FIG. 26, controller 140 includes a full bridge driver 2690 and a half bridge drive 2691 which are each comprised of commercially available components identified by model numbers IR2110 available from International Rectifier. It should be realized by one of ordinary skill in the art that a full bridge driver 2690 includes two such components while driver 2691 includes only one such component. In the most preferred embodiment of the invention, rotor 350 is controlled by driver 2690, while rotor 351 is controlled by the combination of drivers 2690 and 2691. Such control is achieved by the selective energization of the drivers 2690 and 2691. Such control is achieved by the selective energization of the drivers 2690 and 2691 by the microcontroller 2615 in response to the stored software program included within memory 2620. Lastly, controller 140 includes an interface portion 2695 which, in the preferred embodiment of the invention, is comprised of a commercially available input-output communication component identified as a Model OAC5. This "I/O" component may be obtained from Grayhill Corporation having an office in Detroit, Mich. Component 2695 is communicatively coupled to microcontroller 140 in a manner which will allow the microcontroller to communicate with a conventional numerical controller 2696, such as an Allen-Bradley Model 8600. Conventional numerical controller signals such as "RUN", "READ" and "ALARM" may be passed to the numeric controller. From the foregoing it should be apparent to one of ordinary skill in the art that a microcontroller 140 receives signals indicative of rotating machine shaft vibration and rotor position and, in response to the received signals, selectively energizes, or causes to be energized, drivers 2690 and 2691, in a manner which has been previously described and which will allow the rotors to rotate to the desired position. It is this driver energization which causes the rotors to move, positioning the heavy spots in the desired manner to compensate for machine unbalance.

As shown in FIG. 5, each rotor 350, 351 has an identifiable position represented by a certain respective angle measured with respect to a fixed arbitrary reference point. Moreover, each rotor 350, 351 has a certain pre-determined imbalance magnitude 510, 511 associated with it. The respective imbalance magnitudes 510, 511, in combination with the angular position, defines a vector having a directional component fixed by the angular position and a magnitude fixed by the amount of imbalance. A net correction vector 520 results from the vector addition of the two vectors 510 and 511.

In the preferred embodiments of the invention, microprocessor based controller 2611 contains software algorithms stored in memory which cause the automatic operation of the active balancer to dynamically balance the rotating machine in real time.

To compensate for rotating machine unbalance, the unbalance magnitude and angular position on the shaft must be estimated. The following discussion details the calculations for this estimation and steps for real time dynamic automatic balancing in the preferred embodiment of the invention.

Figure 27:
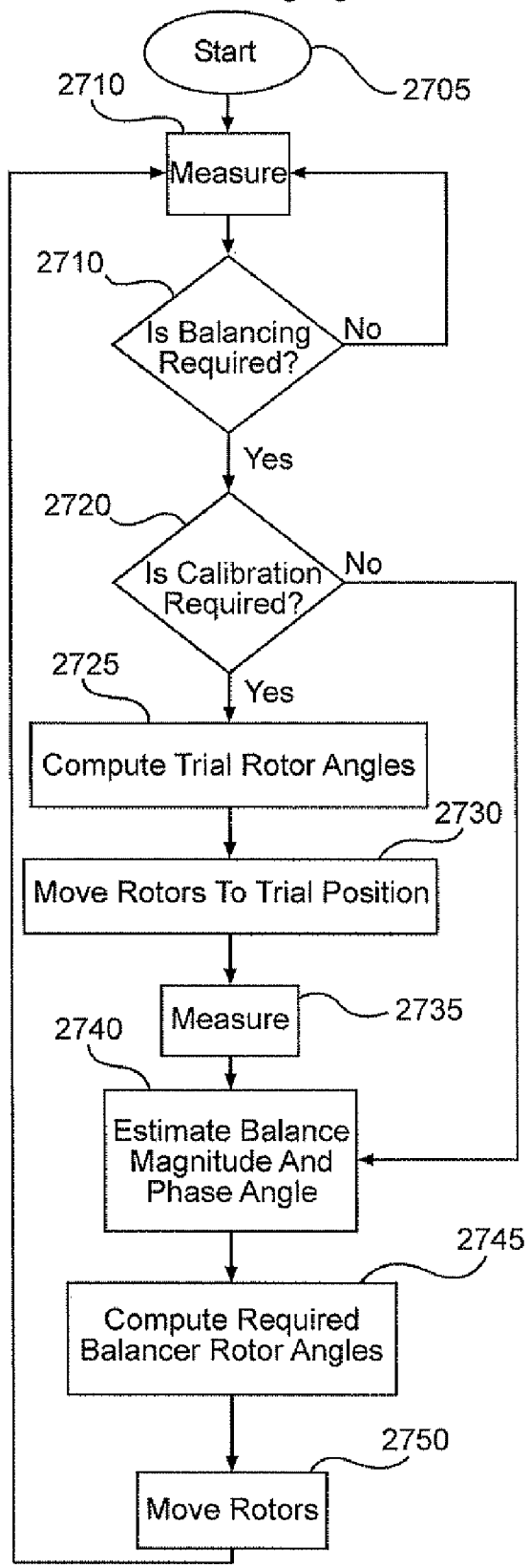
FIG. 27 is a flow chart illustrating sequence of steps associated with dynamically balancing a rotating machine with an active balancer.

The relationship between vibration amplitude and rotating machine shaft unbalance magnitude is assumed to be linear but unknown. The assumption of linearity is very good for most applications, since although vibration magnitudes are significant, they are relatively low. A mathematical algorithm is used to estimate unbalance magnitude and angular position based on certain measurable quantities. To accomplish the estimation when no machine data is previously stored, a "trial" balance step is required for calibration. This means that after start-up, the balancer "ballast" must be moved to an arbitrary trial position before it can be moved to the final correction position. Since the balancer rotors may "slip" during shaft start-up due to limited holding torque, the initial balance correction would not necessarily be "neutral". Balance correction could be in any position. The vector math equations described below take this possibility into account. For certain applications, however, the vibration-unbalance relationship for a machine configuration would be known a priori. In such instances, calibration using a trial balance correction would be unnecessary. To reduce balance time required, the balancer rotors could be directly moved to the appropriate compensating positions virtually immediately after shaft start-up. It is prudent, however, to implement a routine for the more general case where the vibration-unbalance ratio is not necessarily known. Steps in the automatic balancing algorithm for the general case are outlined in the flow chart of FIG. 27. The steps are described below:

Step 1, Machine Start-up 2705:
Upon start-up, the balancer controller begins the automatic machine monitoring/balancing routine.

Step 2, Measurement 2710:
The following quantities are measured using the vibration transducer sensor and shaft and rotor position sensors:

Initial vibration amplitude (peak amplitude in units of length)

Initial vibration phase angle (radians, with respect to the arbitrary machine reference)

Initial balancer rotor angles

Step 3, Compare 2715:
The peak machine vibration level is compared to a preset vibration limit. If vibration exceeds the maximum limit, the balancing routine is implemented. If vibration remains below the set limit, the balancer controller returns to the measurement step 2 2710 and vibration is continuously monitored.

Step 4, Calibration choice 2720:
If machine stiffness data is available which maps speed and unbalance information to machine vibration level, no balancer calibration is required and the algorithm skips directly to step 8 2740.

Step 5, Trial rotor angle computation 2725:
The trial calibration angles for the balancer rotors are chosen based on certain criteria. The criteria include but are not limited to: 1) Minimizing unbalance during the calibration step; 2) Minimizing balancer error due to measurement uncertainties; or 3) Minimizing time required for balancing.

Step 6, Rotor actuation to trial positions 2730:
The rotors are actuated to the required trial positions using driver 120.

Step 7, Measurement 2735:
The following quantities are measured:

"Trial" vibration amplitude (peak amplitude in units of length)

"Trial" vibration phase angle (radians, with respect to the arbitrary machine reference)

"Trial" balance rotor angles

Step 8, Estimation 2740:
Using the values measured above, the controller calculates the unbalance magnitude (in units of mass-length, or unit-less % of balancer capacity) and phase angle. The estimation method is described below in more detail.

Step 9, Balance rotor angle computation 2745:
Calculate the balancer rotor angles that will provide the required correction vector. If the respective rotor unbalance magnitudes are very closely similar, for example, the rotors would be placed at appropriate equal angles from the effective correction angle. Which rotor moves to which position could be decided based on certain criteria such as: 1) minimizing time to balance; or 2) minimizing unbalance magnitude present during the time the rotors move.

Step 10, Rotor actuation 2750:

The rotors are moved to the required positions using the power driver 120.

The controller then returns to step 2 2710 to monitor machine vibration until changes in machine parameters make further balancing necessary.

Rotating unbalance in the machine is estimated in step 8 2740 using concepts from vector algebra. To facilitate estimation, the measured vectors from steps 2 2710 and 7 2735 are broken down into their Cartesian x and y-direction components.

With the balancer mounted on rotating machine 22, the total rotating unbalance will consist of the vector sum of balancer rotor unbalance magnitudes and the inherent machine rotating unbalance. The measured vibration values, therefore, also result from the vector sum of each unbalance source. We define the unknown machine rotating unbalance components as Xu and Yu. We also define the relationship between rotating unbalance and vibration level as R. This ratio R is a function of bearing and shaft stiffness and is also assumed to be unknown. If R is known for a given machine operating condition, then the estimation is much simpler and is not shown here.

The unbalance angle quadrant must be determined accurately for successful balance compensation. Most high level programming language compilers include an intrinsic function "a tan 2" which calculates the angle of a vector in the appropriate quadrant given x and y-direction vector components. The required balance correction magnitude B, will be the same as the unbalance magnitude. The correction angle will be 180.degree. (or .pi. radians) away from the unbalance. The correction angle should be mapped back into the appropriate polar quadrant if it exceeds 360.degree. This correction would then be implemented using the two balancer rotors. In some cases the rotors would have slightly different unbalances due to manufacturing variations. In such cases, slightly more complicated formulas must be used which utilize trigonometry which should be known to one of ordinary skill in the art. Which rotor should move to which position is then determined such that the rotors travel the minimum combined distance. This minimizes time required for the final balancing step.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. An active balancer for dynamically balancing a rotating machine having a driven shaft with a torsional vibration, said active balancer having a balancer body which rotates with said shaft, said balancer body having a mass, said active balancer comprised of a first controllable position counter weight balance ring rotor and a second controllable position counter weight balance ring rotor, said first controllable position counter weight balance ring rotor having a first balance ring rotor adjustable angular position relative to said balancer body and said shaft with said first controllable position counter weight balance ring rotor moved relative to said shaft and said balancer body with a first balance ring rotor controllable electromagnetic field, said second controllable position counter weight balance ring rotor having a second balance ring rotor adjustable angular position relative to said balancer body and said shaft with said second controllable position counter weight balance ring rotor moved relative to said shaft and said balancer body with a second balance ring rotor controllable electromagnetic field in order to produce an adjustable controllable counter weight balance force for continuously dynamically balancing said rotating machine, said balancer including a spring, said balancer body mounted to said shaft through said spring wherein said balancer body mass continuously rotates with said shaft, and said balancer body mass resonates on said spring with a torsional vibration canceling frequency which cancels the torsional vibration of said shaft.

2. An active balancer as claimed in claim 1, including a means for actively controlling said first balance ring rotor adjustable angular position separately from said second balance ring rotor adjustable angular position.

3. An active balancer as claimed in claim 1, wherein said active balancer is comprised of a first controllable position counter weight and a second controllable position counter weight.

4. An active balancer as claimed in claim 3, wherein said first controllable position counter weight and said second controllable position counter weight produce a net balance correction vector.

5. An active balancer as claimed in claim 3, wherein said active balancer includes a controller which controls and actuates the position of said first controllable position counter weight and the position of said second controllable position counter weight.

6. An active balancer as claimed in claim 1, wherein said spring is comprised of an elastomer.

7. An active balancer as claimed in claim 1, wherein said spring provides a resilient flexure interface between said balancer body mass and said shaft with said balancer body mass having a delayed oscillation which destructively interferes with said shaft torsional vibration.

8. An active balancer as claimed in claim 1, wherein said spring is comprised of a plurality of radiating spokes.

9. An active balancer as claimed in claim 1, further including a second active balancer, said second active balancer positioned on said driven shaft at a second position distal from said active balancer, said second active balancer having a second balancer body mass and a second balancer spring, said second active balancer mounted to said shaft through said second balancer spring at said second position wherein said second balancer body mass resonates on said second balancer spring with a second balancer torsional vibration canceling frequency which cancels a torsional vibration.

10. An active balancer as claimed in claim 1, wherein said first controllable position counter weight balance ring rotor is held with a first balance ring magnet holding force at said first balance ring rotor adjustable angular position and said second controllable position counter weight balance ring rotor is held with a second balance ring magnet holding force at said second balance ring rotor adjustable angular position.

11. A method of actively balancing a rotating member having a torsional vibration, said method including providing an active balancer having a balancer body which rotates with said rotating member, said balancer body having a mass, said active balancer comprised of a first controllable position counter weight balance ring rotor and a second controllable position counter weight balance ring rotor, said first controllable position counter weight balance ring rotor having a first balance ring rotor adjustable angular position relative to said balancer body and said rotating member with said first controllable position counter weight balance ring rotor moved relative to said rotating member and said balancer body with a first balance ring rotor controllable electromagnetic field, said second controllable position counter weight balance ring rotor having a second balance ring rotor adjustable angular position relative to said balancer body and said rotating member with said second controllable position counter weight balance ring rotor moved relative to said rotating member and said balancer body with a second balance ring rotor controllable electromagnetic field inorder to produce an adjustable controllable counter weight balance force for continuously dynamically balancing said rotating member, providing a spring, mounting said active balancer to said rotating member with said spring wherein said balancer body mass resonates on said spring with a torsional vibration canceling frequency which cancels the torsional vibration of said rotating member.

12. A method as claimed in claim 11, wherein providing an active balancer with at least one controllable position counter weight includes providing an active balancer with an electromagnetically actuated counter weight which is electromagnetically moved around said rotating member.

13. A method as claimed in claim 11, wherein providing an active balancer with at least one controllable position counter weight includes providing an active balancer with a first controllable position counter weight and a second controllable position counter weight.

14. A method as claimed in claim 13, wherein said first controllable position counter weight and said second controllable position counter weight produce a net balance correction vector.

15. A method as claimed in claim 13, said method including providing a controller which controls and actuates the position of said first controllable position counter weight and the position of said second controllable position counter weight.

16. A method as claimed in claim 11, wherein providing a spring includes providing a spring comprised of an elastomer.

17. An active balancer as claimed in claim 11, wherein providing a spring includes providing a resilient flexure interface between said balancer body mass and said rotating member with said balancer body mass having a delayed oscillation which destructively interferes with said rotating member torsional vibration.

18. A method as claimed in claim 11, wherein providing a spring includes providing a spring comprised of a plurality of radiating spokes.

19. A method as claimed in claim 11, wherein said rotating member is comprised of a shaft having a shaft torsional resonance modal mass inertia, and said balancer body inertial mass is less than fifteen percent of said shaft torsional resonance modal mass inertia.

20. A method as claimed in claim 11, further comprising providing a second active balancer, said second active balancer having a second balancer body mass and a second balancer spring, mounting said second active balancer through said second balancer spring at a second position on said rotating member wherein said second balancer body mass resonates on said second balancer spring with a second balancer torsional vibration canceling frequency which cancels a torsional vibration.

21. A method as claimed in claim 11, wherein said first controllable position counter weight balance ring rotor is held with a first balance ring magnet holding force at said first balance ring rotor adjustable angular position and said second controllable position counter weight balance ring rotor is held with a second balance ring magnet holding force at said second balance ring rotor adjustable angular position.

22. A method of making a balancer for balancing a rotating member having a torsional vibration, said method including providing a balancer having a balancer body which rotates with said rotating member, said balancer body having a mass, said balancer comprised of a first controllable position counter weight balance ring rotor and a second controllable position counter weight balance ring rotor, said first controllable position counter weight balance ring rotor having a first balance ring rotor adjustable angular position relative to said balancer body and said rotating member with said first controllable position counter weight balance ring rotor moved relative to said rotating member and said balancer body with a first balance ring rotor controllable electromagnetic field, said second controllable position counter weight balance ring rotor having a second balance ring rotor adjustable angular position relative to said balancer body and said rotating member with said second controllable position counter weight balance ring rotor moved relative to said rotating member and said balancer body with a second balance ring rotor controllable electromagnetic field in order to produce a counter weight balance force for continuously balancing said rotating member, providing a mounting spring having a rotating member mounting side and a balancer body attachment side, attaching said mounting spring balancer body attachment side to said balancer wherein said balancer body mass resonates on said spring with a torsional vibration canceling frequency which cancels the torsional vibration of said rotating member when said mounting spring rotating member mounting side is mounted on said rotating member.

23. A method as claimed in claim 22, wherein providing a balancer with at least one controllable position counter weight includes providing an active balancer with an electromagnetically actuated counter weight which is electromagnetically moved around said rotating member.

24. A method as claimed in claim 22, wherein providing a balancer with at least one controllable position counter weight includes providing an active balancer with a first controllable position counter weight and a second controllable position counter weight.

25. A method as claimed in claim 24, wherein said first controllable position counter weight and said second controllable position counter weight produce a net balance correction vector.

26. A method as claimed in claim 24, said method including providing a controller which controls and actuates the position of said first controllable position counter weight and the position of said second controllable position counter weight.

27. A method as claimed in claim 22, wherein providing a mounting spring includes providing a mounting spring comprised of an elastomeric spring having a rotating member mounting inner side and a balancer body outer side.

28. A method as claimed in claim 22, wherein providing a mounting spring includes providing a resilient flexure interface between said balancer body mass and said rotating member with said balancer body mass having a delayed oscillation which destructively interferes with said rotating member torsional vibration.

29. A method as claimed in claim 22, wherein providing a mounting spring includes providing a mounting spring comprised of a plurality of radiating spokes having rotating member mounting inner ends and distal balancer body outer ends.

30. A method as claimed in claim 22, wherein said rotating member is comprised of a shaft having has a shaft torsional resonance modal mass inertia, and said balancer body inertial mass is less than fifteen percent of said shaft torsional resonance modal mass inertia.

31. A method as claimed in claim 22, wherein said first controllable position counter weight balance ring rotor is held with a first balance ring magnet holding force at said first balance ring rotor adjustable angular position and said second controllable position counter weight balance ring rotor is held with a second balance ring magnet holding force at said second balance ring rotor adjustable angular position.

32. An active balancer for dynamically balancing a rotating machine shaft having a torsional vibration resonance modal mass inertia, said active balancer having a balancer body which rotates with said rotating machine, said balancer body having a inertial mass, said balancer body inertial mass less than fifteen percent of said torsional vibration resonance modal mass inertia, said active balancer comprised of a first controllable position counter weight balance ring rotor and a second controllable position counter weight balance ring rotor, said first controllable position counter weight balance ring rotor having a first balance ring rotor adjustable angular position relative to said balancer body and said rotating machine shaft with said first controllable position counter weight balance ring rotor moved relative to said rotating machine shaft member and said balancer body with a first balance ring rotor controllable electromagnetic field, said second controllable position counter weight balance ring rotor having a second balance ring rotor adjustable angular position relative to said balancer body and said rotating machine shaft with said second controllable position counter weight balance ring rotor moved relative to said rotating machine shaft and said balancer body with a second balance ring rotor controllable electromagnetic field in order to produce an adjustable controllable counter weight balance force for continuously dynamically balancing said rotating machine, said balancer including a spring, said balancer body mounted to said rotating machine through said spring wherein said balancer body mass resonates on said spring with a torsional vibration canceling frequency.

33. An active balancing system for dynamically balancing a rotating machine shaft having at least one torsional vibration, said active balancing system comprised of a first active balancer with a first active balancer body which rotates with said shaft, said first active balancer body having a first active balancer body mass, said first active balancer comprised of a first controllable position counter weight balance ring rotor and a second controllable position counter weight balance ring rotor, said first controllable position counter weight balance ring rotor having a first balance ring rotor adjustable angular position relative to said balancer body and said rotating machine shaft with said first controllable position counter weight balance ring rotor moved relative to said rotating machine shaft and said balancer body with a first balance ring rotor controllable electromagnetic field, said second controllable position counter weight balance ring rotor having a second balance ring rotor adjustable angular position relative to said balancer body and said rotating machine shaft with said second controllable position counter weight balance ring rotor moved relative to said rotating machine shaft and said balancer body with a second balance ring rotor controllable electromagnetic field in order to produce a first active balancer adjustable controllable counter weight balance force for dynamically balancing said rotating machine, said first active balancer including a first active balancer spring, said first active balancer body mounted to said shaft through said first active balancer spring at a first shaft position, a second active balancer, said second active balancer positioned on said shaft at a second position distal from said first active balancer, said second active balancer having a second balancer body mass and a second balancer spring, said second active balancer mounted to said shaft through said second balancer spring at said second position.

34. A balancer for balancing a rotating shaft with a torsional vibration, said balancer having a balancer body which rotates with said shaft, said balancer body having a mass, said balancer comprised of a first controllable position counter weight balance ring rotor and a second controllable position counter weight balance ring rotor, said first controllable position counter weight balance ring rotor having a first balance ring rotor adjustable angular position relative to said balancer body and said rotating member with said first controllable position counter weight balance ring rotor moved relative to said rotating member and said balancer body with a first balance ring rotor controllable electromagnetic field, said second controllable position counter weight balance ring rotor having a second balance ring rotor adjustable angular position relative to said balancer body and said rotating member with said second controllable position counter weight balance ring rotor moved relative to said rotating member and said balancer body with a second balance ring rotor controllable electromagnetic field in order to produce an adjustable controllable counter weight balance force for balancing said rotating shaft, said balancer including a spring, said balancer body mounted to said shaft through said spring wherein said balancer body mass resonates on said spring with a torsional vibration canceling frequency which cancels the torsional vibration of said shaft.

* * * * *